(12) United States Patent
Hetzler et al.

(10) Patent No.: US 12,481,796 B2
(45) Date of Patent: Nov. 25, 2025

(54) SECURE MEMORY SHARING

(71) Applicant: International Business Machines Corporation, Armonk, NY (US)

(72) Inventors: Steven Robert Hetzler, Los Altos, CA (US); Guerney D. H. Hunt, Yorktown Heights, NY (US); Charles R. Johns, Austin, TX (US); James A. Kahle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 17/138,552

(22) Filed: Dec. 30, 2020

(65) Prior Publication Data

US 2022/0207191 A1    Jun. 30, 2022

(51) Int. Cl.
*G06F 21/79* (2013.01)
*G06F 21/60* (2013.01)
(Continued)

(52) U.S. Cl.
CPC ............ *G06F 21/79* (2013.01); *G06F 21/602* (2013.01); *G06F 21/72* (2013.01); *G06F 21/74* (2013.01)

(58) Field of Classification Search
CPC ........ G06F 21/79; G06F 21/602; G06F 21/72; G06F 21/74
See application file for complete search history.

(56) References Cited

U.S. PATENT DOCUMENTS 5,940,870 A * 8/1999 Chi .................... G06F 12/0813
709/216
7,181,017 B1    2/2007 Nagel et al.
(Continued)

FOREIGN PATENT DOCUMENTS

| CN | 102065135 A | 5/2011 |
|---|---|---|
| CN | 108768633 A | 11/2018 |

(Continued)

OTHER PUBLICATIONS

Wu et al., "Comprehensive VM Protection against Untrusted Hypervisor through Retrofitted AMD Memory Encryption," IEEE International Symposium on High Performance Computer Architecture, 2018, pp. 441-453.

Furtak, J., "Cryptographic Keys Generating and Renewing System for IoT Network Nodes—A Concept," Sensors, vol. 20, 2020, pp. 1-31.

(Continued)

*Primary Examiner* — Theodore C Parsons
*Assistant Examiner* — Alan L Kong
(74) *Attorney, Agent, or Firm* — Zilka-Kotab, P.C.

(57) ABSTRACT

A computer-implemented method includes, receiving, by a source node, a request from a destination node for data stored in a region of shared memory controlled by the source node. The data is encrypted in a local key of the source node. The method includes decrypting, by the source node, the locally encrypted data using the local key and encrypting, by the source node, the decrypted data using a first key for generating first encrypted data. The method also includes encrypting, by the source node, the first encrypted data using a second key for generating second encrypted data, and sending, by the source node, the second encrypted data to the destination node. A computer program product includes one or more computer readable storage media and program instructions collectively stored on the one or more computer readable storage media. The program instructions includes program instructions to perform the foregoing method.

21 Claims, 12 Drawing Sheets

(51) Int. Cl.
*G06F 21/72* (2013.01)
*G06F 21/74* (2013.01)

(56) References Cited

U.S. PATENT DOCUMENTS

| | | | |
|---|---|---|---|
| 7,548,987 B2 | 6/2009 | Jabri et al. | |
| 8,904,181 B1 | 12/2014 | Felsher et al. | |
| 8,966,287 B2 | 2/2015 | Bogorad | |
| 9,104,618 B2 | 8/2015 | Sela et al. | |
| 9,342,466 B2 | 5/2016 | Shapiro | |
| 9,800,560 B1 | 10/2017 | Guo et al. | |
| 9,847,979 B2 | 12/2017 | Peterka et al. | |
| 10,033,702 B2 | 7/2018 | Ford et al. | |
| 10,127,389 B1* | 11/2018 | Roth | G06F 21/602 |
| 10,528,485 B2 | 1/2020 | Chhabra et al. | |
| 10,735,137 B2 | 8/2020 | Yanovsky et al. | |
| 2005/0256742 A1* | 11/2005 | Kohan | G06F 21/6254 705/2 |
| 2008/0049942 A1* | 2/2008 | Sprunk | H04L 9/006 380/283 |
| 2012/0110327 A1* | 5/2012 | Doerner | H04L 9/0825 713/165 |
| 2012/0284522 A1* | 11/2012 | Lewis | H04L 65/765 713/181 |
| 2013/0097421 A1* | 4/2013 | Lim | H04L 63/12 713/167 |
| 2015/0163053 A1* | 6/2015 | Izu | H04L 63/0478 713/168 |
| 2016/0182229 A1* | 6/2016 | Glickman | G06F 21/86 380/44 |
| 2016/0275309 A1* | 9/2016 | Austin | G06F 21/6254 |
| 2016/0335201 A1* | 11/2016 | Lea | G06F 21/71 |
| 2019/0386957 A1* | 12/2019 | Leon | H04L 63/0876 |
| 2020/0134207 A1 | 4/2020 | Doshi et al. | |
| 2020/0313880 A1* | 10/2020 | Marinet | H04L 9/0861 |
| 2021/0067495 A1* | 3/2021 | Yuting | H04L 9/3247 |
| 2021/0167955 A1* | 6/2021 | Rameez | H04L 9/0894 |

FOREIGN PATENT DOCUMENTS

| | | |
|---|---|---|
| CN | 112133396 A | 12/2020 |
| CN | 112150147 A | 12/2020 |
| CN | 116745766 A | 9/2023 |
| DE | 112021005979 T5 | 8/2023 |
| EP | 1220079 A2 | 7/2002 |
| GB | 2616811 A | 9/2023 |
| JP | H04-181282 A | 6/1992 |
| JP | 2016-152041 A | 8/2016 |
| JP | 2017-537538 A | 12/2017 |
| JP | 2024-501168 A | 1/2024 |
| WO | 2016/126296 A1 | 8/2016 |
| WO | 2022/144643 A1 | 7/2022 |

OTHER PUBLICATIONS

Olakanmi et al., "An efficient point-to-point security solution for multihop routing in wireless sensor networks," Wiley, Special Issue Article, 2019, pp. 1-14.

Dang et al., "The Meeting of Acquaintances: A Cost-Efficient Authentication Scheme for Light-Weight Objects with Transient Trust Level and Plurality Approach," Hindawi, Security and Communication Networks, Wol. 2019, Apr. 2019, pp. 1-18.

Chan et al., "PIKE: Peer Intermediaries for Key Establishment in Sensor Networks," Proceedings IEEE 24th Annual Joint Conference of the IEEE Computer and Communications Societies, 2005, 13 pages, retrieved from https://www.semanticscholar.org/paper/PIKE%3A-peer-intermediaries-for-key-establishment-in-Chan-Perrig/49c3428dc5ce3e321e21bc5840299af9d6a30796.

Wikipedia, "Transcoding," Wikipedia, 2020, 4 pages, retrieved from https://en.wikipedia.org/wiki/Transcoding.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

Hetzler et al., U.S. Appl. No. 17/138,539, filed Dec. 30, 2020.

International Search Report and Written Opinion from PCT Application No. PCT/IB2021/061458, dated Mar. 16, 2022.

Japan Patent Office, "Notice of Reasons for Refusal" Jun. 2, 2025, 12 Pages, JP Application No. 2023-534079.

* cited by examiner

SECURE MEMORY SHARING

BACKGROUND

The present invention relates to secure memory sharing using storage systems, and more particularly, this invention relates to secure transcoders for securing memory sharing in cloud storage systems and networks.

It is desirable to securely share data stored in shared memory between various computer nodes. Secure data transfer is especially beneficial for providing compute functions near stored data. For example, each node may have a specific compute function (e.g., a database, an inference engine, etc.). Access controls are conventionally used in prior art approaches to limit data sharing. Access controls are not foolproof and may lead to data leakage. For example, privileges may be escalated, the controls may be misconfigured, etc.

In other prior art approaches, a source node encrypts the stored data. In another approach, the source node may decrypt data and send the data over a secure link for sharing. In yet another approach, the source node will decrypt the data and the source node may share the source node's decryption key with a destination node. In these applications, there are many opportunities for data leakage. For some applications, homomorphic encryption may be used to provide secure access to data, but the homomorphic encryption is limited to situations where the destination is allowed to perform computations on data without having access to the plaintext of the data. The utility of homomorphic encryption is limited by its slow performance.

These various prior art approaches tend to require a high degree of trust in the destination node. Furthermore, these conventional approaches lack flexibility for function replacement. There remains a need in the art for a method of securely sharing data in shared memory and allowing operations (e.g., such as compute near the storage) while providing a high degree of security for shared data, including the ability to terminate sharing, especially if the destination node misbehaves.

BRIEF SUMMARY

A computer-implemented method, according to one aspect, includes receiving, by a source node, a request from a destination node for data stored in a region of shared memory controlled by the source node. The data is encrypted in a local key of the source node. The method includes decrypting, by the source node, the locally encrypted data using the local key and encrypting, by the source node, the decrypted data using a first key for generating first encrypted data. The method also includes encrypting, by the source node, the first encrypted data using a second key for generating second encrypted data, and sending, by the source node, the second encrypted data to the destination node. This aspect advantageously allows for sharing and handling of memory ranges within local memory.

The computer-implemented method, according to an optional aspect, includes the region of shared memory being requested by a plurality of destination nodes. At least two of the destination nodes are each associated with a different second key. This optional aspect provides the benefit of separate sharing policies for each destination node and allows the source node to independently control of access for each destination node.

A computer program product, according to one aspect, includes one or more computer readable storage media and program instructions collectively stored on the one or more computer readable storage media. The program instructions includes program instructions to perform the foregoing method.

A computer-implemented method, according to another aspect, includes receiving, by a destination node, second encrypted data. The second encrypted data is data that has been encrypted in a first key to create first encrypted data that is then encrypted in a second key to create the second encrypted data. The method includes receiving, by the destination node, the second key and receiving, by the destination node, the first key. The method also includes decrypting, by the destination node, the second encrypted data using the second key to obtain the first encrypted data and decrypting, by the destination node, the first encrypted data using the first key to obtain the data. This aspect advantageously adapts the load/store model for memory to provide the ability to share access to data in memory between a source node and a destination node.

The computer-implemented method, according to one optional aspect, includes the first key being received from a key manager. This optional aspect provides the benefit of a key manager which implements the sharing policy between the destination node and the source node.

A computer-implemented method, according to another aspect, includes receiving, by a destination node, second encrypted data. The second encrypted data is data that has been encrypted in a first key to create first encrypted data that is then encrypted in a second key to create the second encrypted data. The first key is associated with a region of memory controlled by a source node. The second key is associated with the destination node. The method includes receiving, by the destination node, the second key and receiving, by the destination node, the first key. The method also includes decrypting, by the destination node, the second encrypted data using the second key to obtain the first encrypted data and decrypting, by the destination node, the first encrypted data using the first key to obtain the data. This aspect advantageously facilitates sharing between the destination node and the source node by adding security from data leakage and giving access control to the source node.

The computer-implemented method, according to one optional aspect, includes the second key being received from the source node. This optional aspect provides the benefit of allowing the source node to retain ultimate control over the sharing between the destination node and the source node.

A computer-implemented method, according to another aspect, includes receiving, by a transcoder, second encrypted data. The second encrypted data is data stored in a region of shared memory controlled by a source node. The data is encrypted in a first key to create first encrypted data that is then encrypted in a second key to create the second encrypted data. The method includes receiving, by the transcoder, the second key and decrypting, by the transcoder, the second encrypted data using the second key to obtain the first encrypted data. The method also includes encrypting, by the transcoder, the first encrypted data using a third key to create third encrypted data, sending, by the transcoder, the third key to a destination node and sending, by the transcoder, the third encrypted data to the destination node. This aspect advantageously enables the destination node to access and decrypt data for as long as the transcoder allows the destination node to do so according to a sharing policy established between the source node and the transcoder.

The computer-implemented method, according to one optional aspect, includes the third key being received from a transcoder manager. This optional aspect provides the benefit of allowing the secure transcoder manager to perform relatively heavyweight functions for the transcoder(s), such as generating the keys, and keeps relatively lightweight functions coupled to the memory via the secure transcoders.

Other aspects and approaches of the present invention will become apparent from the following detailed description, which, when taken in conjunction with the drawings, illustrate by way of example the principles of the invention.

DETAILED DESCRIPTION

Figure 1:
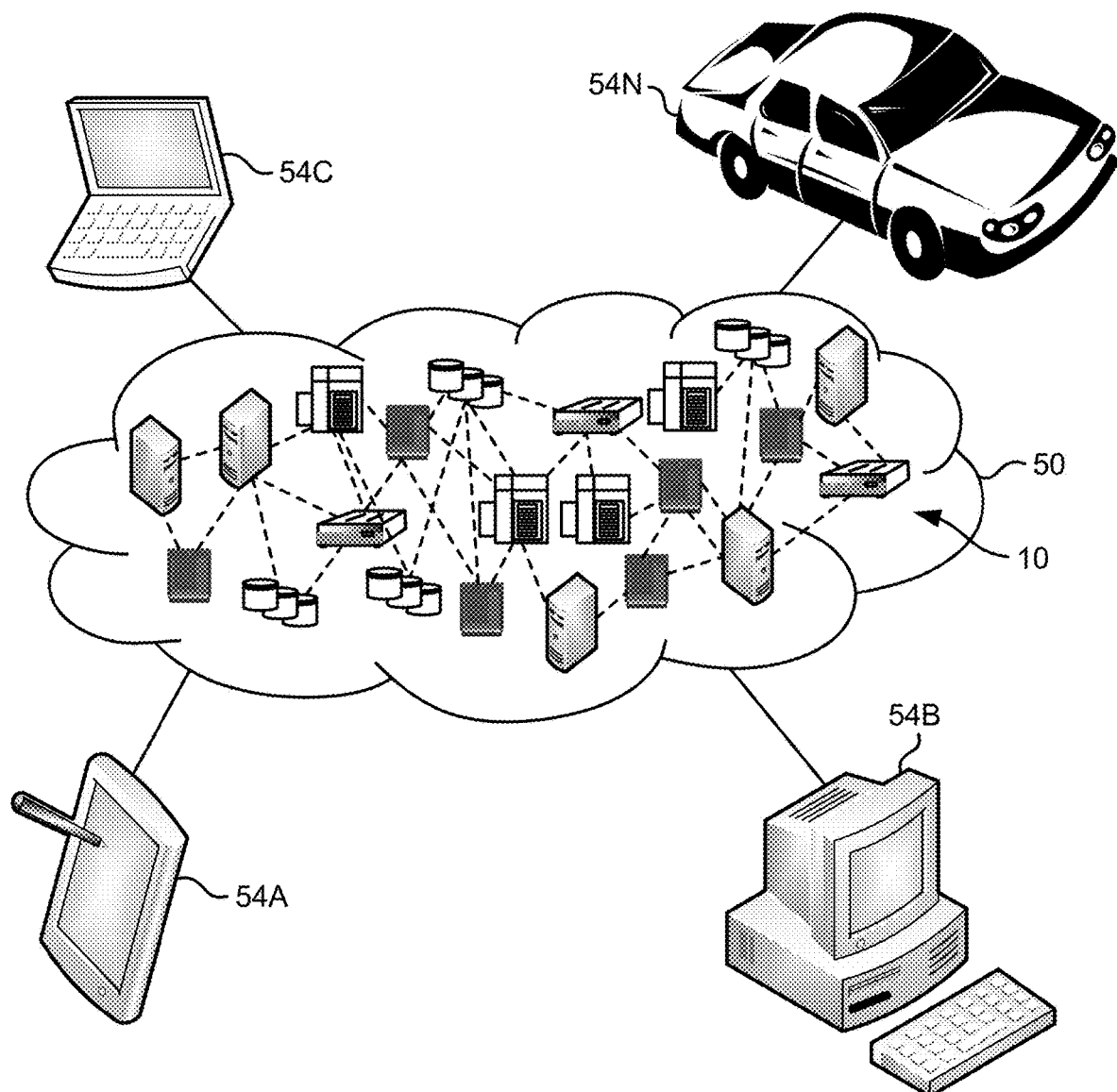
FIG. 1 depicts a cloud computing environment in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several aspects of sharing access to memory controlled by source node to one or more destination nodes, preferably using a transcoder to provide the destination node with access to the memory without access to the source secret key(s) for decrypting the memory.

In one general aspect, a computer-implemented method includes receiving, by a source node, a request from a destination node for data stored in a region of shared memory controlled by the source node. The data is encrypted in a local key of the source node. The method includes decrypting, by the source node, the locally encrypted data using the local key and encrypting, by the source node, the decrypted data using a first key for generating first encrypted data. The method also includes encrypting, by the source node, the first encrypted data using a second key for generating second encrypted data, and sending, by the source node, the second encrypted data to the destination node.

In another general aspect, a computer program includes one or more computer readable storage media and program instructions collectively stored on the one or more computer readable storage media. The program instructions includes program instructions to perform the foregoing method.

In another general aspect, a computer-implemented method includes receiving, by a destination node, second encrypted data. The second encrypted data is data that has been encrypted in a first key to create first encrypted data that is then encrypted in a second key to create the second encrypted data. The method includes receiving, by the destination node, the second key and receiving, by the destination node, the first key. The method also includes decrypting, by the destination node, the second encrypted data using the second key to obtain the first encrypted data and decrypting, by the destination node, the first encrypted data using the first key to obtain the data.

In another general aspect, a computer-implemented method includes receiving, by a destination node, second encrypted data. The second encrypted data is data that has been encrypted in a first key to create first encrypted data that is then encrypted in a second key to create the second encrypted data. The first key is associated with a region of memory controlled by a source node. The second key is associated with the destination node. The method includes receiving, by the destination node, the second key and receiving, by the destination node, the first key. The method also includes decrypting, by the destination node, the second encrypted data using the second key to obtain the first encrypted data and decrypting, by the destination node, the first encrypted data using the first key to obtain the data.

In another general aspect, a computer-implemented method includes receiving, by a transcoder, second encrypted data. The second encrypted data is data stored in a region of shared memory controlled by a source node. The data is encrypted in a first key to create first encrypted data that is then encrypted in a second key to create the second encrypted data. The method includes receiving, by the transcoder, the second key and decrypting, by the transcoder, the second encrypted data using the second key to obtain the first encrypted data. The method also includes encrypting, by the transcoder, the first encrypted data using a third key to create third encrypted data, sending, by the transcoder, the third key to a destination node, and sending, by the transcoder, the third encrypted data to the destination node.

It is to be understood that although this disclosure includes a detailed description on cloud computing, implementation of the teachings recited herein are not limited to a cloud computing environment. Rather, aspects of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
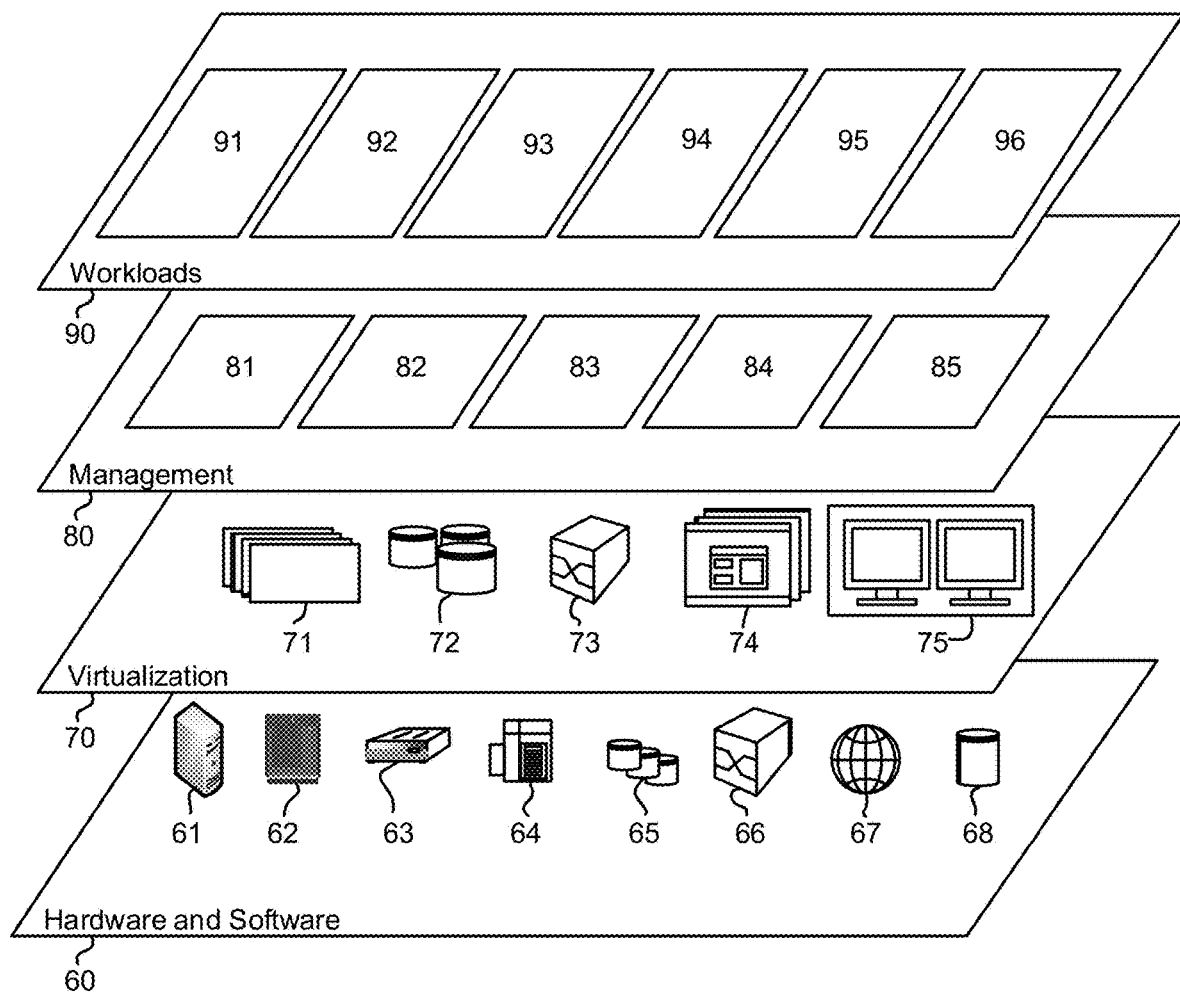
FIG. 2 depicts abstraction model layers in accordance with one aspect of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and aspects of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some aspects, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure memory sharing 96.

Various aspects of the present invention include sharing access to data in memory between a source node and a destination node. In preferred aspects, the source node uses a local key to encrypt the data stored in local memory. For the memory to be shared, the data is decrypted from the local key and then encrypted by the source node with a first source key and the encrypted data (e.g., first encrypted data) is further encrypted by the source node with a second source key to create doubly encrypted data (e.g., second encrypted data).

At least some aspects of the present invention includes sharing access to data in memory between a source node and a destination node, using a secure transcoder to provide the destination node with access to the data without access to the source secret keys for decrypting the stored data. In preferred aspects, the stored data is encrypted by the source node with a first source key and the encrypted data (e.g., first encrypted data) is further encrypted by the source node with a second source key to create doubly encrypted data (e.g., second encrypted data). The first source key is shared with the destination node and the second source key is shared with the secure transcoder. The transcoder provides a third key and shares the third key with the destination node. The transcoder decrypts the doubly encrypted data using the second key and reencrypts the now singly encrypted data in the third key for creating doubly encrypted data using the third key (e.g., third encrypted data). The destination node accesses the doubly encrypted data (e.g., encrypted in the first key and further encrypted in the third key) via the transcoder and the destination node is able to access the unencrypted data using the first key and the third key.

At least some of the aspects of the present invention adapt the load/store model for memory to provide the ability to share access to data in memory between a source node and a destination node. For example, various operations disclosed herein address sharing local memory, handling of memory ranges with multiple destinations, transcoding memory controllers, etc.

Advantageously, at least some aspects of the present invention enable the destination node to access and decrypt data for as long as the transcoder allows the destination node to do so (e.g., according to a sharing policy established between the source node and the transcoder). Furthermore, the transcoder never has access to the plaintext data and the destination node is prevented from future access to the data once the sharing policy is changed.

At least some of the aspects described herein are advantageously usable with symmetric encryption techniques resulting in relatively higher performance compared to relatively slower, public key encryption methods of transferring data between nodes in a system.

Figure 3:
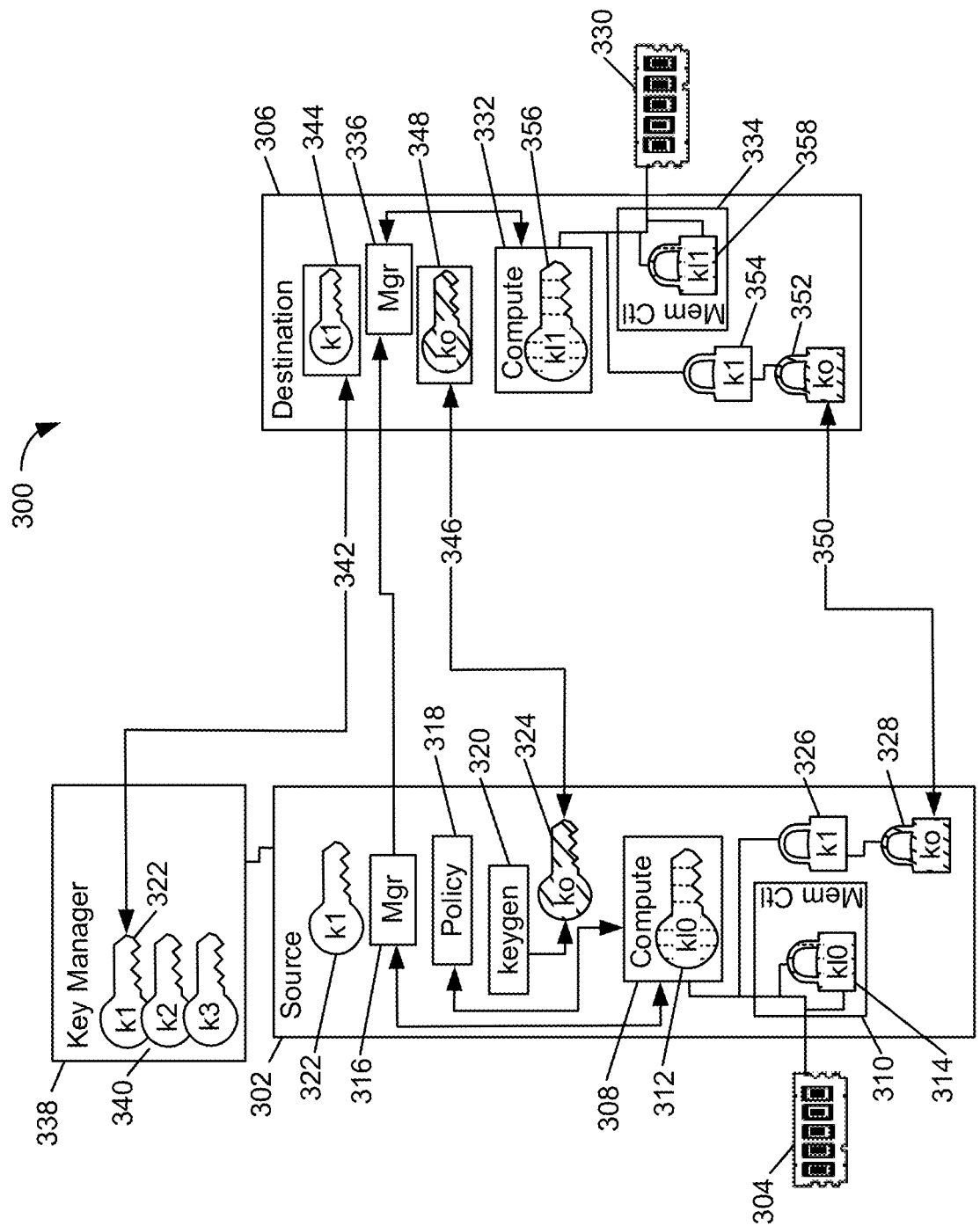
FIG. 3 is a diagram of a high level architecture, in accordance with one aspect of the present invention.

FIG. 3 depicts a high-level architecture, in accordance with various configurations. The architecture 300 may be implemented in accordance with the present invention in any of the environments depicted in FIGS. 1-2 and 4-9, among others, in various configurations. Of course, more, or less elements than those specifically described in FIG. 3 may be included in architecture 300, as would be understood by one of skill in the art upon reading the present descriptions.

Architecture 300 includes a high level architecture comprising a source node 302, source node local memory 304, and a destination node 306. In various approaches, a range of the source node local memory 304 is shared between the source node 302 and the destination node 306. The source node 302 includes a source node compute function 308 and a source node memory controller 310. The source node compute function 308 comprises a source node local memory encryption key 312 (e.g., the local key) which is used with the source node local key encrypt/decrypt function 314 to encrypt and decrypted data on the source node local memory 304. Any encrypt/decrypt function described herein may be configured to encrypt and/or decrypt data using suitable key(s) and any known encryption technique(s), as would be understood by one having ordinary skill in the art upon reading the present disclosure. In preferred aspects, the source node local memory encryption key 312 is not shareable (e.g., the source node local memory encryption key 312 is securely stored such that it may be used by the source node local key encrypt/decrypt function 314, but the source node local memory encryption key 312 is not extractable). Any local key (e.g., local encryption key) may be ephemeral in that a power outage on memory (local or remote), shreds or otherwise destroys the local key, the data stored in the memory, etc.

Source node 302 comprises a source node sharing management function 316, a sharing policy 318, a first key 322, a key generator 320, and a second key 324. The source node 302 comprises a source node first key encrypt/decrypt function 326 and a source node second key encrypt/decrypt function 328. In various approaches, the key generator 320 generates the second key 324. The second key 324 may be generated by the source node 302 in some approaches. In other approaches, the second key 324 may be generated by the destination node 306. In preferred aspects, the second key 324 is generated by the key generator 320 or the source node 302 to avoid exposure to a weak key, key reuse, etc. In yet other approaches, any key as described herein may be generated and/or managed by a key generator and/or key manager known in the art (such as key manager 338), as would become apparent to one having ordinary skill in the art upon reading the present disclosure.

Destination node 306 includes a destination node local memory 330, a destination node compute function 332, a destination node memory controller 334, and a destination node sharing management function 336.

An exemplary implementation of architecture 300 is described with reference to the arrows of FIG. 3. Preferably, prior to sharing a range of the source node local memory 304, the source node 302 creates the sharing policy 318. The sharing policy 318 may include information such as the memory range(s) to share, the destination node(s) to share with, the allowed access of the memory including the duration, allowed read/write operations, the number of allowed operations, etc., or any combination thereof. In various approaches, the policy 318 may include what regions of shared memory may be shared between which entities, a time length for a sharing period between any entities, a number of operations associated with a sharing period between any entities, the type of operations associated with a sharing period between any entities, an amount of data which may be shared per sharing period between any entities, etc. In various approaches, the policy 318 may determine the types of access (e.g., read, write, read/write, etc.) that the destination node 306 has to shared data. Any attempts to access shared data which is inconsistent with policy 318 (e.g., invalid), are denied in a manner which would become apparent to one having ordinary skill in the art upon reading the present disclosure. For example, if there is no key associated with the requested range or the requested range is outside the policy the key manager will not return a first key for the request as described below. In another example, in a plurality of destination nodes requesting the same or different region of memory, one destination node may have read only access (according to its sharing policy), a separate destination node may have write only access (according to its sharing policy), and a third destination node may have read/write access (according to its sharing policy). Each destination node may have a separate sharing policy which may be independent of the number of requests each destination node is allowed to make. The sharing policy may be independent of the type of access and/or limited to the number of requests of that type that are allowed, in some approaches.

Various aspects described herein assume that the request for data is allowed (e.g., valid). Preferably, prior to sharing a range of the source node local memory 304, the source node 302 and the destination node 306 authenticate each other to verify each other's identities. In one approach, the source node sharing management function 316 and the destination node sharing management function 336 authenticate each other to verify each other's identities (e.g., the identity of the source node 302 and the identity of the destination node 306). In various approaches, the identities of each component in architecture 300 may be authenticated according to protocols known in the art. In some approaches, the authentication may be part of setting up secure communication connections between the parties. In preferred aspects, all the communication links are secure (e.g., encrypted).

Source node 302 requests a first key 322 from key manager 338 which creates and maintains a set of first keys 340. The key generator 320 creates second key 324. Second key 324 is preferably temporal (e.g., the second key 324 may be shredded by the source node 302 in response to terminating the sharing policy with the destination node 306). The source node 302 informs the key manager 338 to allow destination node 306 to access the first key 322 according to the policy 318. In at least some approaches, the policy 318 may be in the key manager 338. In another approach, the policy 318 may be in a policy manager (not shown) which is external to the source node 302. The destination node 306 requests the first key 322 from the key manager 338 at operation 342. The destination node 306 stores the first key 322 in first key storage 344. The source node 302 sends a copy of the second key 324 to the destination node 306 in operation 346. The destination node 306 stores the second key 324 in second key storage 348. The memory range(s) associated with a key may also be stored in the key manager 338 in a manner which would become apparent to one having ordinary skill in the art. For example, each first key 322 in the set of first keys 340 may be associated with a range of the source node local memory 304. In response to receiving a request from the destination node 306 for data stored in the source node local memory 304, the key manager 338 sends an appropriate first key 322 for the range of data associated with the request.

In preferred implementations, when the destination node 306 performs a read from the region of shared memory (e.g., the source node local memory 304), the source node local key encrypt/decrypt function 314 decrypts the data using the source node local memory encryption key 312. The source node first key encrypt/decrypt function 326 encrypts the unencrypted data using the first key 322 to obtain first encrypted data (e.g., data encrypted in the first key 322). The first encrypted data is then encrypted by the source node second key encrypt/decrypt function 328 using the second key 324 to obtain second encrypted data (e.g., data encrypted in the first key 322 and then encrypted in the second key 324). The doubly encrypted data (e.g., the second encrypted data) is sent to the destination node 306 in operation 350.

Destination node 306 comprises a destination node second key encrypt/decrypt function 352 and a destination node first key encrypt/decrypt function 354. In various approaches, the destination node includes a destination node local memory encryption key 356 for use with a destination node local key encrypt/decrypt function 358. The destination node second key encrypt/decrypt function 352 decrypts the second encrypted data using the second key 324 stored in the second key storage 348 to obtain first encrypted data (e.g., data only encrypted in the first key 322). The destination node first key encrypt/decrypt function 354 decrypts the first encrypted data using the first key 322 stored in the first key storage 344 to obtain the unencrypted data. In various approaches, the plaintext data is output to the destination node memory controller 334. The destination node local key encrypt/decrypt function 358 may encrypt the plaintext data using the destination node local memory encryption key 356. The data, now encrypted in the destination node local memory encryption key 356, may be stored in the destination node local memory 330. In an alternative approach, the decrypted data (e.g., the plaintext data, not encrypted in any key) may be sent to the destination node compute function 332 for performing operations thereon, in a manner that would become apparent to one having ordinary skill in the art upon reading the present disclosure.

The source node 302 may revoke sharing permission from the destination node 306 at any time. In some approaches, the source node 302 informs the destination node 306 that the sharing has been terminated. In response to terminating the sharing, the destination node preferably deletes the stored copies of the first key 322 and the second key 324. The sharing policy may be terminated in any manner that would become apparent to one having ordinary skill in the art upon reading the present disclosure, such as by a command from the source node 302 to the destination node 306, the key manager 338, any other component, etc., or any combination thereof. In other approaches, the sharing policy may be terminated by a request from the destination node 306 to the source node 302.

In other approaches, the source node 302 may revoke sharing permission by shredding (e.g., deleting or otherwise destroying) the second key 324 in a manner known in the art. Shredding the second key 324 prevents the destination node 306 from any future access of plaintext from the source node local memory 304, even if the destination node 306 finds a means to bypass the policy 318. Thus, secrecy is preserved even if the destination node 306 misbehaves by retaining the first key 322 and the second key 324, stored in the first key storage 344 and the second key storage 348, respectively, after the sharing policy has been terminated according to policy 318.

Advantageously, having the first key 322 delivered by the key manager 338 and the second key 324 delivered by the source node 302 allows the source node 302 to retain ultimate control over the sharing. Where the second key 324 is not available to the key manager 338, the key manager 338 does not have sufficient information to allow a destination node 306 to access the data in a region of shared memory. In other approaches, the set of first keys 340 may be stored in the source node 302 for additional security and access control.

Figure 4:
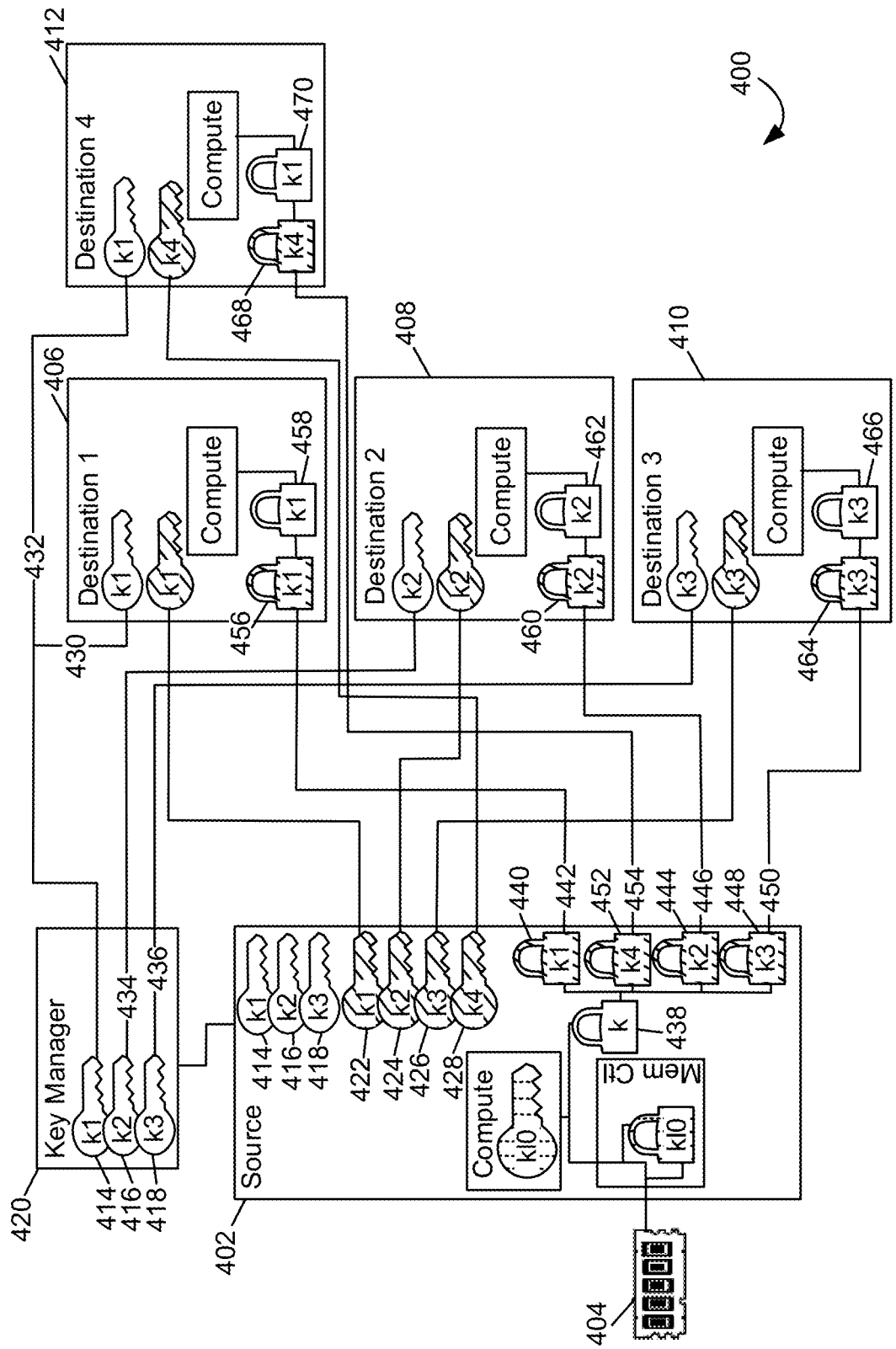
FIG. 4 is a diagram of a high level architecture, in accordance with one aspect of the present invention.

FIG. 4 depicts a high-level architecture, in accordance with various configurations. The architecture 400 may be implemented in accordance with the present invention in any of the environments depicted in FIGS. 1-3 and 5A-9, among others, in various configurations. Of course, more, or less elements than those specifically described in FIG. 4 may be included in architecture 400, as would be understood by one of skill in the art upon reading the present descriptions.

FIG. 4 is a simplified aspect for sharing multiple ranges of a source node's local memory with multiple destination nodes. The use of the first key and the second key, as described in FIG. 3, advantageously facilitates such sharing by adding security from data leakage and access control to the source node.

Architecture 400 includes a high level architecture comprising a source node 402, source node local memory 404, and a plurality of destination nodes. The destination nodes include destination node 1 406, destination node 2 408, destination node 3 410, and destination node 4 412. Source node 402 shares 3 regions of the source node local memory 404 with the 4 destination nodes. The first region of the source node local memory 404 is shared with destination node 1 406 and destination node 4 412. The second region of the source node local memory 404 is shared with destination node 2 408. The third region of the source node local memory 404 is shared with destination 3 410.

Source node 402 requests 3 first keys (first key k1 414, first key k2 416, first key k3 418) from key manager 420, one first key for each region of the source node local memory 404. Specifically, first key k1 414 may correspond to a first region of memory in the source node local memory 404, first key k2 416 may correspond to a second region of memory in the source node local memory 404, and first key k3 418 may correspond to a third region of memory in the source node local memory 404. Source node 402 creates 4 second keys (second key k1 422, second key k2 424, second key k3 426, second key k4 428), one for each destination node. Specifically, second key k1 422 may correspond to destination node 1 406, second key k2 424 may correspond to destination node 2 408, second key k3 426 may correspond to destination node 3 410, and second key k4 428 may correspond to destination node 4 412. The source node 402 may send each of the second keys to the associated destination node in manner which would become apparent to one having ordinary skill in the art upon reading the present disclosure.

It is beneficial for the first keys to be distinct per shared region and the second keys to be distinct per destination node. The distinct first keys keep the data regions cryptographically isolated. The distinct second keys allows the sharing policies to be controlled separately for each destination. For example, in preferred aspects, revoking a first key terminates the sharing of a region and revoking a second key terminates the sharing of a destination node (e.g., the sharing period between the source node 402 and the destination node associated with the revoked second key). In this way, the access to the data on the source node local memory 404 for each destination node and each region in the memory is controlled independently.

In an alternative aspect, the source node 402 may group destination nodes. Each group of destination nodes may be given access to the same range of memory for the same period of time. An exemplary implementation of the foregoing aspect may be used in a cloud environment where Company A is sharing information with Company B and the destination nodes represent individuals within Company A. If either company terminates the collaboration, Company A shreds the second key associated with the collaboration. All parties in Company A who were accessing the information based on the collaboration lose access.

Preferably, prior to sharing, destination node 1 406 requests the first key k1 414 from the key manager 420 in operation 430 and destination 4 412 requests the first key k1 414 from the key manager 420 in operation 432. Destination node 2 408 requests the first key k2 416 from the key manager 420 in operation 434. Destination node 3 410 requests the first key k3 418 from the key manager 420 in operation 436.

In the present implementation, a source node first key encrypt/decrypt function 438 may use any of the first encryption keys (e.g., first key k1 414, first key k2 416, first key k3 418) to encrypt the appropriate region of data stored in the source node local memory 404 in manner which would become apparent to one having ordinary skill in the art upon reading the present disclosure. In other approaches, a source node second key encrypt/decrypt function (not shown) may use any of the second encryption keys (second key k1 422, second key k2 424, second key k3 426, second key k4 428) to encrypt the data for the appropriate destination node in manner which would become apparent to one having ordinary skill in the art upon reading the present disclosure.

For data shared with destination node 1 406, the source node first key encrypt/decrypt function 438 encrypts the data in the first region with the first key k1 414. The source node second key k1 encrypt/decrypt function 440 then encrypts the data in the first region with the second key k1 422 to obtain second encrypted data. The second encrypted data (e.g., data encrypted in first key k1 414 and then encrypted in the second key k1 422) is sent to destination node 1 406 in operation 442.

For data shared with destination node 2 408, the source node first key encrypt/decrypt function 438 encrypts the data in the second region with the first key k2 416. The source node second key k2 encrypt/decrypt function 444 then encrypts the data in the second region with the second key k2 424 to obtain second encrypted data. The second encrypted data (e.g., data encrypted in first key k2 416 and then encrypted in the second key k2 424) is sent to destination node 2 408 in operation 446.

For data shared with destination node 3 410, the source node first key encrypt/decrypt function 438 encrypts the data in the third region with the first key k3 418. The source node second key k3 encrypt/decrypt function 448 then encrypts the data in the third region with the second key k3 426 to obtain second encrypted data. The second encrypted data (e.g., data encrypted in first key k3 418 and then encrypted in the second key k3 426) is sent to destination node 3 410 in operation 450.

For data shared with destination node 4 412, the source node first key encrypt/decrypt function 438 encrypts the data in the first region with the first key k1 414. The source node second key k4 encrypt/decrypt function 452 then encrypts the data in the first region with the second key k4 428 to obtain second encrypted data. The second encrypted data (e.g., data encrypted in first key k1 414 and then encrypted in the second key k4 428) is sent to destination node 4 410 in operation 454.

Destination node 1 406 includes a destination node 1 second key encrypt/decrypt function 456 and a destination node 1 first key encrypt/decrypt function 458. In response to receiving the second encrypted data (e.g., data encrypted in first key k1 414 and then encrypted in the second key k1 422), the destination node 1 second key encrypt/decrypt function 456 may decrypt the second encrypted data using the second key k1 422 to obtain first encrypted data (e.g., data encrypted in first key k1 414). The destination node 1 first key encrypt/decrypt function 458 may then decrypt the first encrypted data using the first key k1 414 to obtain the data in the clear.

Destination node 2 408 includes a destination node 2 second key encrypt/decrypt function 460 and a destination node 2 first key encrypt/decrypt function 462. In response to receiving the second encrypted data (e.g., data encrypted in first key k2 416 and then encrypted in the second key k2 424), the destination node 2 second key encrypt/decrypt function 460 may decrypt the second encrypted data using the second key k2 424 to obtain first encrypted data (e.g., data encrypted in first key k2 416). The destination node 2 first key encrypt/decrypt function 462 may then decrypt the first encrypted data using the first key k2 416 to obtain the data in the clear.

Destination node 3 410 includes a destination node 3 second key encrypt/decrypt function 464 and a destination node 3 first key encrypt/decrypt function 466. In response to receiving the second encrypted data (e.g., data encrypted in first key k3 418 and then encrypted in the second key k3 426), the destination node 3 second key encrypt/decrypt function 464 may decrypt the second encrypted data using the second key k3 426 to obtain first encrypted data (e.g., data encrypted in first key k3 418). The destination node 3 first key encrypt/decrypt function 466 may then decrypt the first encrypted data using the first key k3 418 to obtain the data in the clear.

Destination node 4 412 includes a destination node 4 second key encrypt/decrypt function 468 and a destination node 4 first key encrypt/decrypt function 470. In response to receiving the second encrypted data (e.g., data encrypted in first key k1 414 and then encrypted in the second key k4 428), the destination node 4 second key encrypt/decrypt function 468 may decrypt the second encrypted data using the second key k4 428 to obtain first encrypted data (e.g., data encrypted in first key k1 414). The destination node 4 first key encrypt/decrypt function 470 may then decrypt the first encrypted data using the first key k1 414 to obtain the data in the clear.

The use of the distinct second keys, for example, second key k1 422 and second key k4 428, allows the source node 402 to individually control the access to the common shared region of the source node local memory 404. For example, sharing with destination node 1 406 may be terminated by the source node 402 by shredding the second key k1 422. Destination node 1 406 is unable to decrypt data from the shared region, even if kept its own copy of the second key (second key k1 422) and the first key (first key k1 414). Destination node 4 412, which shared access to the region of the source node local memory 404, may continue accessing the shared region using first key k1 414 and its own second key (second key k4 428).

FIGS. 5A-5D depict high-level architectures, in accordance with various configurations. The architectures 500 may be implemented in accordance with the present invention in any of the environments depicted in FIGS. 1-4 and 6-9, among others, in various configurations. Of course, more, or less elements than those specifically described in FIGS. 5A-5D may be included in architecture 500, as would be understood by one of skill in the art upon reading the present descriptions.

FIGS. 5A-5D depict variations of high-level architectures for sharing regions of remote memory controlled by a source node using a secure transcoder function. Therefore, common features have common numbering as would become apparent to one having ordinary skill in the art upon reading the present disclosure.

Figure 5A:
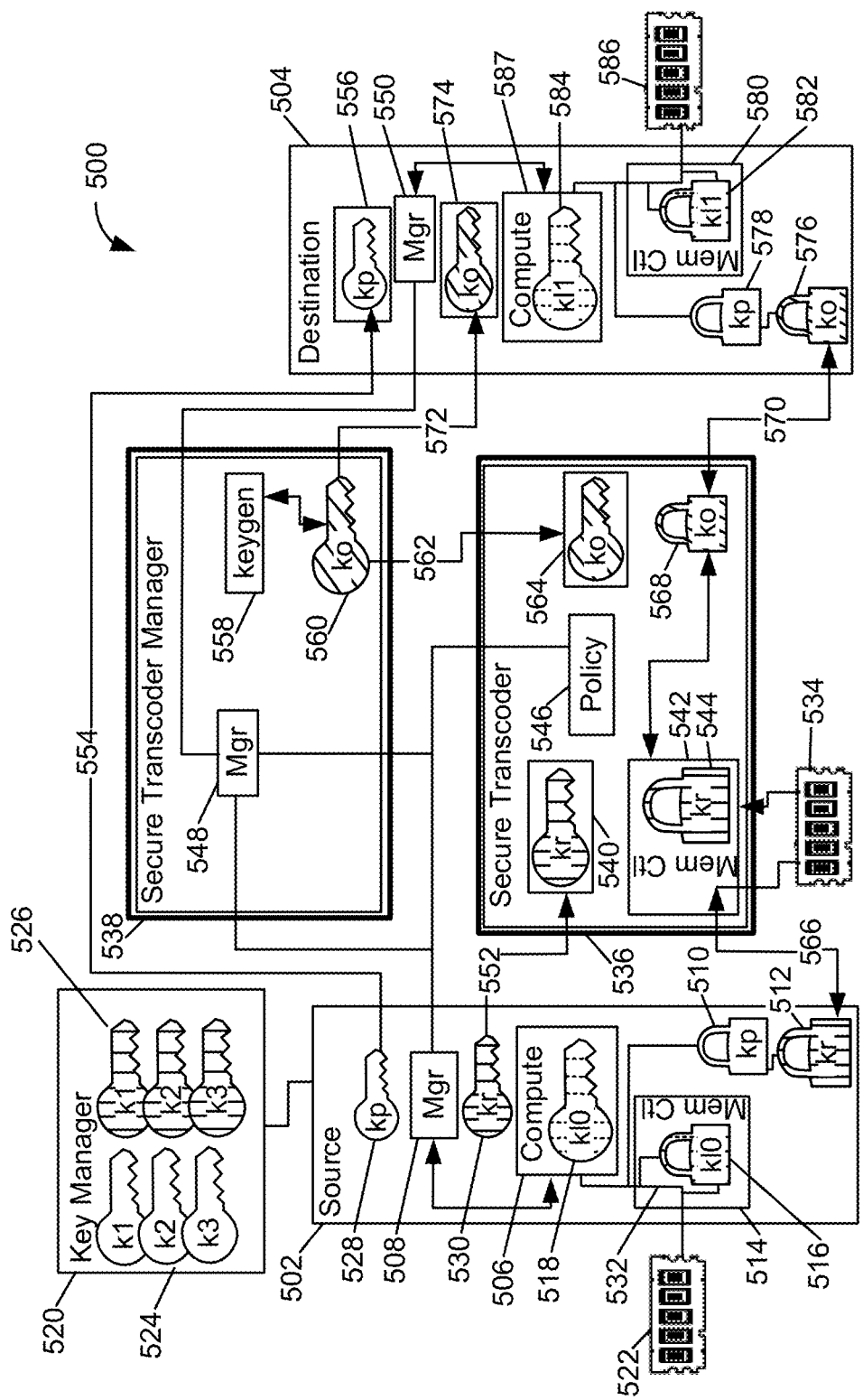
FIGS. 5A-5D are diagrams of high level architectures, in accordance with one aspect of the present invention.

Architecture 500 of FIG. 5A includes a source node 502 and a destination node 504. The source node 502 includes a source node compute resource 506 and a source node sharing manager function 508. The source node 502 includes a source node first key encrypt/decrypt function 510 and a source node second key encrypt/decrypt function 512. The source node 502 comprises a source node local memory controller 514 having a source node local memory encrypt/decrypt function 516 which uses a source node local memory encryption key 518. The source node is preferably coupled to a key manager 520 and a source node local memory 522. The key manager 520 stores and manages a set of first keys 524 and a set of second keys 526. In some approaches, architecture 500 does not include a key manager 520 and the source node 502 maintains the set of first keys 524 and the set of second keys 526.

In various approaches, the source node 502 requests a first key 528 of the set of first keys 524 from the key manager 520. The source node also requests a second key 530 of the set of second keys 526 from the key manager 520. Both the first key 528 and the second key 530 may be used by the source node 502 to share a range of data stored in memory with the destination node 504.

Source node compute resource 506 stores data in source node local memory 522 using the source node local memory controller 514. Data may be stored as it is created via path 532. In preferred aspects, secure encryption for the data may be provided by the source node local memory encryption key 518 used with the source node local memory encrypt/decrypt function 516, which may be part of the source node local memory controller 514. The source node local memory encryption key 518 is preferably ephemeral.

The source node compute resource 506 may also store data in remote memory 534. Source node 502 may be coupled to a secure transcoder 536 and a secure transcoder manager 538. The secure transcoder 536 comprises second key storage 540 for second key 530, a secure transcoder memory controller 542, secure transcoder second key encrypt/decrypt function 544, and a policy management function 546. The secure transcoder 536 policy management function 546 provides the benefit of allowing sharing to continue between the source node 502 and the destination node 504 using the secure transcoder 536, even if the secure transcoder 536 becomes uncoupled to the secure transcoder manager 538 (e.g., thereby making the system more fault tolerant). In preferred aspects, the second key storage 540 for second key 530 limits access of the stored second key 530 to the secure transcoder second key encrypt/decrypt function 544. The secure transcoder manager 538 may be coupled to a plurality of transcoders (not shown), in various approaches. The secure transcoder manager 538 may advantageously perform relatively heavyweight functions for the transcoder(s) and keep relatively lightweight functions coupled to the memory via the secure transcoders.

For sharing remote memory, the first keys and the second keys are preferably persistent where the source node 502 and the remote memory 534 may fail independently. The key manager 520 is one approach for persisting the keys.

Regions of remote memory 534 may be shared between the source node 502 and destination node 504. The policy management function 546 on the secure transcoder 536 stores, provides, implements, etc., sharing policy information as described in FIG. 3 and other FIGS. After authenticating the secure transcoder manager 538 (e.g., using the secure transcoder manager function 548) and the secure transcoder 536 (e.g., using the policy management function 546), the source node 502 sends range ownership information to the policy management function 546. In preferred aspects, the source node 502 securely sends the second key 530 to the secure transcoder 536 in operation 552 and the secure transcoder 536 stores the second key 530 in the second key storage 540. In response to confirming the policy and authenticating the destination node 504 using the destination node manager function 550, the source node 502 sends the first key 528 to the destination node 504 in operation 554 and the destination node 504 stores the first key 528 in first key storage 556. Key generator 558 on the secure transcoder manager 538 generates a third key 560 and sends the third key 560 to the secure transcoder 536 in operation 562. In other approaches, the secure transcoder 536 manages and/or generates the third key 560 without a secure transcoder manager 538. The secure transcoder 536 preferably stores the third key 560 in secure transcoder third key storage 564.

When the source node 502 writes data to the remote memory 534, the data is first encrypted by the source node first key encrypt/decrypt function 510 using the first key 528 to obtain first encrypted data (e.g., data encrypted in first key 528). The first encrypted data is then encrypted by the source node second key encrypt/decrypt function 512 using the second key 530 to obtain second encrypted data (e.g., data encrypted in first key 528 and then encrypted in the second key 530). The second encrypted data is sent to the secure transcoder 536 in operation 566. The secure transcoder 536 may store the second encrypted data in the remote memory 534.

When the destination node 504 performs a read from the shared region of remote memory 534, the secure transcoder second key encrypt/decrypt function 544 decrypts the second encrypted data using the second key 530 to obtain the first encrypted data (e.g., data encrypted in the first key 528). The secure transcoder 536 does not have access to the data in the clear where the secure transcoder 536 does not have the first key 528. The secure transcoder 536 encrypts the first encrypted data with the third key 560 using secure transcoder third key encrypt/decrypt function 568 to obtain third encrypted data (e.g., data encrypted in the first key 528 and then encrypted in the third key 560). The third encrypted data is sent in operation 570 to the destination node 504.

The destination node 504 receives the third key 560 from the secure transcoder manager 538 in operation 572 and stores the third key 560 in destination node third key storage 574. Destination node 504 decrypts the third encrypted data (e.g., data encrypted in the first key 528 and then encrypted in the third key 560) using the destination node third key encrypt/decrypt function 576 using the third key 560 to obtain the first encrypted data (e.g., data encrypted in the first key 528). Destination node 504 decrypts the first encrypted data using the destination node first key encrypt/decrypt function 578 using the first key 528 to obtain the data in the clear.

In some approaches, the plaintext data (e.g., the data in the clear) may be output to the destination node memory controller 580. A destination node local memory encrypt/decrypt function 582 may encrypt the plaintext data using a destination node local memory encryption key 584. The locally encrypted data may be stored in the destination node local memory 586. In other approaches, the plaintext data may be accessed directly by the destination node compute resource 587 in manner which would become apparent to one having ordinary skill in the art upon reading the present disclosure.

Figure 5B:
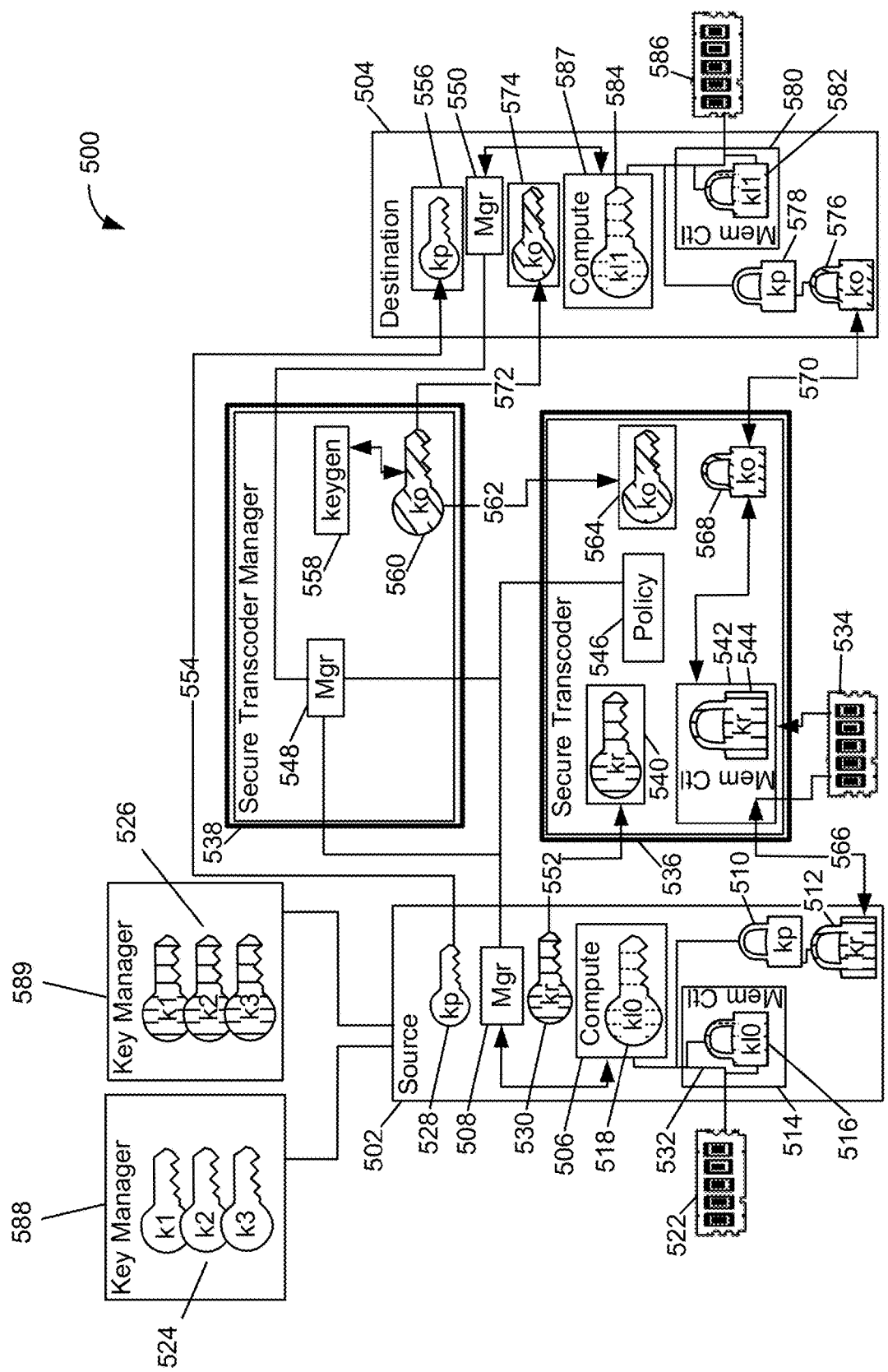

FIG. 5B is a variation of FIG. 5A and common features have common numbering. FIG. 5B depicts a high level architecture 500 having key managers 588 and 589. Key manager 588 may be for storing, managing, maintaining, etc., the set of first keys 524. Similarly, key manager 589 may be for storing, managing, maintaining, etc., the set of second keys 526. Key manager 588 may send the first key 528 to the source node 502 and key manager 589 may send the second key 530 to the source node 502. Having split key managers provides additional security in the system where each component individually authenticates each key manager, thereby supplementing the authentication process.

Figure 5C:
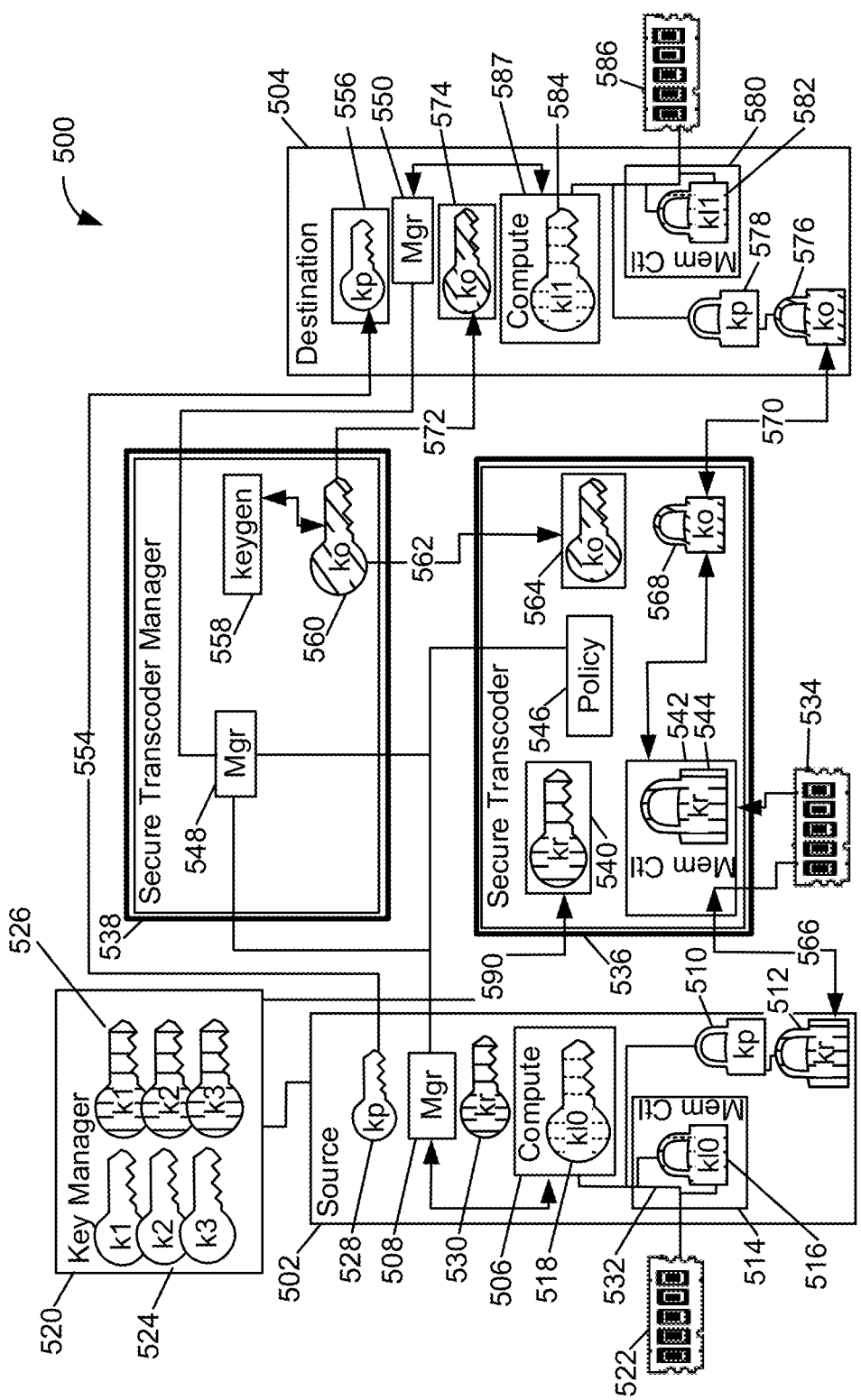

FIG. 5C is a variation of FIG. 5A and common features have common numbering. FIG. 5C depicts a high level architecture 500 where the key manager 520 provides the second key 530 directly to the secure transcoder 536 for storage in the second key storage 540 in operation 590. In this aspect, the key manager 520 still provides a copy of the second key 530 to the source node 502 for performing to encrypt the first encrypted data using the source node second key encrypt/decrypt function 512, as described above, to obtain second encrypted data (e.g., data encrypted with the first key 528 using the source node first key encrypt/decrypt function 510, and then encrypted with the second key 530 using the source node second key encrypt/decrypt function 512).

Figure 5D:
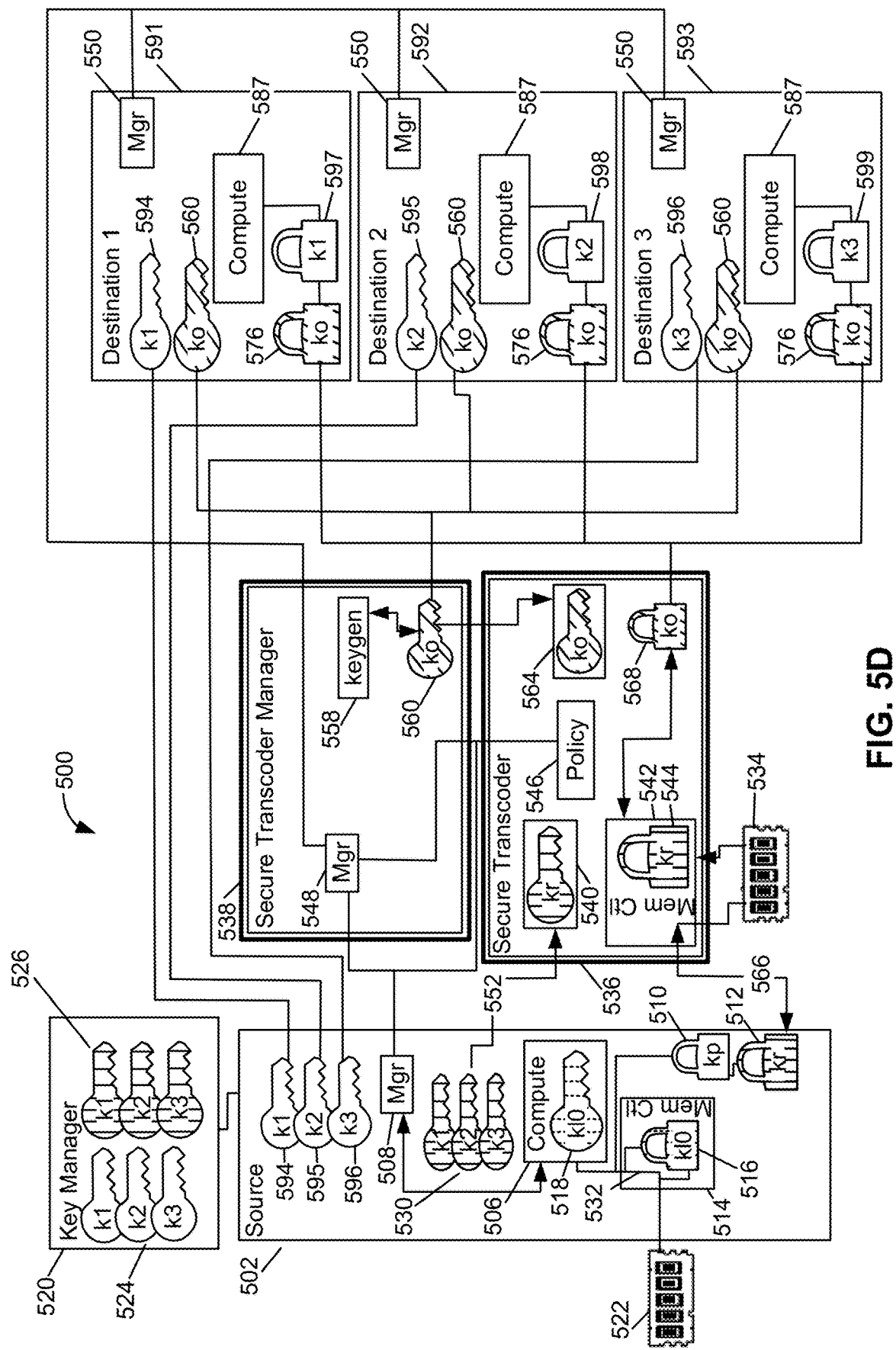

FIG. 5D is a variation of FIG. 5A and common features have common numbering. FIG. 5D depicts a high level architecture 500 including destination 1 node 591, destination 2 node 592, and destination 3 node 593. As shown, in aspects having multiple destinations, a key manager 520 may maintain different first keys in the set of first keys 524, where each first key may be used with an associated destination node. The key manager 520 may send each of the first keys (first key k1 594, first key k2 595, and first key k3 596) to the source node 502. The source node 502 may send each first key to the respective destination node in a manner which would become apparent to one having ordinary skill in the art upon reading the present disclosure. For example, first key k1 594 may be sent from the source node 502 to destination node 1 591, first key k2 595 may be sent from the source node 502 to destination node 2 592, and first key k3 596 may be sent from the source node 502 to destination node 3 593. The secure transcoder 536 may send each of the destination nodes a copy of the third key 560 as described above.

In some aspects, each destination node may be similarly associated with a different second key 530 of the set of second keys 526. In yet other approaches, each region of remote memory 534 may be encrypted with a different first key or each region of remote memory 534 may be encrypted with the same first key.

In various aspects, the source node doubly encrypts data using the source node first key encrypt/decrypt function 510 and then the source node second key encrypt/decrypt function 512, according to at least some of the approaches described herein, to obtain second encrypted data. In preferred approaches, the source node first key encrypt/decrypt function 510 may use any of the set of first keys 524 (first key k1 594, first key k2 595, and first key k3 596) to perform encryption/decryption. Similarly, the source node second key encrypt/decrypt function 512 may use any of the set of second keys (in aspects where each destination is associated with a different second key) to perform encryption/decryption. In other approaches, each different first key and/or each different second key may have its own encrypt/decrypt function.

The secure transcoder 536 may receive the second encrypted data. In aspects where each destination is associated with a different second key, the secure transcoder also receives each copy of the different second keys in operation 552. The secure transcoder second key encrypt/decrypt function 544 may decrypt the second encrypted data using the second key 530 to obtain first encrypted data (e.g., data encrypted in the appropriate first key). The secure transcoder third key encrypt/decrypt function 568 encrypts the first encrypted data using the third key 560 to obtain third encrypted data, as described above.

In preferred aspects, the secure transcoder 536 sends the third encrypted data to the appropriate destination node in a manner which would become apparent to one having ordinary skill in the art upon reading the present disclosure. For example, third encrypted data (e.g., data encrypted in first key k1 594 and then encrypted in the third key 560) is sent to destination node 1 591 comprising the first key k1 594, third encrypted data (e.g., data encrypted in first key k2 595 and then encrypted in the third key 560) is sent to destination node 2 592 comprising the first key k2 595, and third encrypted data (e.g., data encrypted in first key k3 596 and then encrypted in the third key 560) is sent to destination node 3 593 comprising the first key k3 596.

Each destination node may decrypt the third encrypted data to obtain first encrypted data and then decrypt the first encrypted data to obtain data in the clear, using their respective keys, according to the various aspects described above.

Destination node 1 591 uses the destination node third key encrypt/decrypt function 576 to decrypt the third encrypted data using the third key 560 to obtain first encrypted data. Destination node 1 591 then uses a destination node 1 first key k1 encrypt/decrypt function 597 to decrypt the first encrypted data using the first key k1 594 to obtain the data in the clear.

Destination node 2 592 uses the destination node third key encrypt/decrypt function 576 to decrypt the third encrypted data using the third key 560 to obtain first encrypted data. Destination node 2 592 then uses a destination node 2 first key k2 encrypt/decrypt function 598 to decrypt the first encrypted data using the first key k2 595 to obtain the data in the clear.

Destination node 3 593 uses the destination node third key encrypt/decrypt function 576 to decrypt the third encrypted data using the third key 560 to obtain first encrypted data. Destination node 3 593 then uses a destination node 3 first key k3 encrypt/decrypt function 599 to decrypt the first encrypted data using the first key k2 596 to obtain the data in the clear.

In various aspects, there may be multiple source nodes and/or multiple destination nodes. In other aspects, a destination node may be a source node for another destination node. Any number of remote memories coupled to any component may be present in a network for sharing memory between source node(s) and destination node(s).

In preferred aspects, every arrow and/or connecting line shown in FIGS. 3-5D and any communication between the components described herein may include additional protocols for communication encryption known in the art. For example, a communication encryption protocol including Secure Sockets Layer (SSL), Transport Layer Security (TSL), etc., protocols may be used to transfer the keys between the source node and the destination node, between the source node and the secure transcoder, and between the secure transcoder and the destination node, etc., as would become apparent to one having ordinary skill in the art upon reading the present disclosure.

Figure 6:
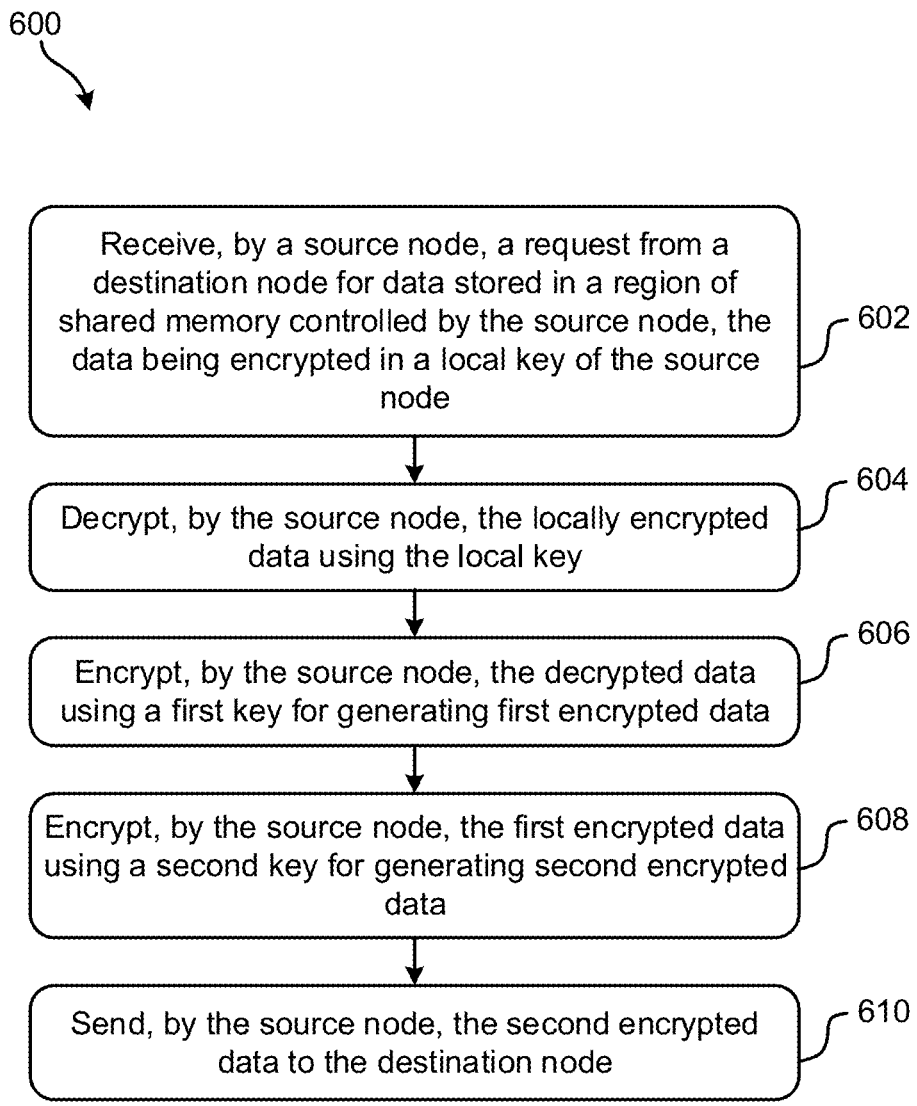
FIG. 6 is a flowchart of a method, in accordance with one aspect of the present invention.

Now referring to FIG. 6, a flowchart of a method 600 is shown according to one aspect. The method 600 may be performed in accordance with the present invention in any of the environments depicted in FIGS. 1-5D and 7-9, among others, in various aspects. Of course, more, or fewer operations than those specifically described in FIG. 6 may be included in method 600, as would be understood by one of skill in the art upon reading the present descriptions.

Each of the steps of the method 600 may be performed by any suitable component of the operating environment. For example, in various aspects, the method 600 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 includes operation 602. Operation 602 includes receiving, by a source node, a request from a destination node for data stored in a region of shared memory of the source node. The request from the destination node may be received in a manner known in the art. In some approaches, the request is for a region of shared memory of the source node which is in local memory of the source node. In other approaches, the request is for a region of shared memory of the source node which is in remote memory of the source node and controlled by the source node. Throughout the present disclosure, the request for a region of shared memory interchangeably refers to a request for data associated with the region (e.g., range) of shared memory as would become apparent to one having ordinary skill in the art upon reading the present disclosure.

In various approaches, the data is encrypted in a local key of the source node. The source node comprises the local key. The local key is not extractable (e.g., not shareable) and is preferably securely stored in the source node. In preferred aspects, the source node uses the local key to encrypt the data stored in local memory (e.g., locally encrypted memory).

Operation 604 includes decrypting, by the source node, the locally encrypted data using the local key. The locally encrypted data is decrypted to obtain data in the clear. In preferred aspects, the source node uses a source node encrypt/decrypt function to decrypt the locally encrypted data to obtain data in the clear.

Operation 606 includes encrypting, by the source node, the decrypted data using a first key for generating first encrypted data. First encrypted data refers to data encrypted in the first key. In preferred aspects, the encryption of the decrypted data using a first key to obtain first encrypted data occurs at the source node. The source node comprises the first key.

Operation 608 includes encrypting, by the source node, the first encrypted data using a second key for generating second encrypted data. Second encrypted data refers to data which was first encrypted in a first key and then encrypted with the second key. As used throughout the present disclosure, second encrypted data may be interchangeably used with doubly encrypted data unless otherwise noted. In preferred aspects, the encryption of data into first encrypted data and then the encryption of first encrypted data into the second encrypted data occurs at a source node. The source node comprises the first key and the second key.

Operation 610 includes sending, by the source node, the second encrypted data to the destination node. The second encrypted data may be sent in a manner known in the art. In various approaches, the destination node is configured to decrypt the second encrypted data using the second key to obtain the first encrypted data using an encrypt/decrypt function on the destination node. The destination node is configured to decrypt the first encrypted data using the first key to obtain the data using an encrypt/decrypt function on the destination node (which may be the same or different from the encrypt/decrypt function for decrypting the second encrypted data to obtain the first encrypted data). The data may be data in the clear, unencrypted data, plaintext data, data in another key-encrypted form, etc., which is associated with the region of shared memory of the source node which was requested by the destination node.

In some approaches, method 600 includes sending, by the source node, the second key to the destination node. The source node may send the second key to the destination node and the destination node uses the second key to decrypt the second encrypted data (e.g., data encrypted in the first key and then encrypted in the second key) to obtain the first encrypted data (e.g., data encrypted in the first key). In other approaches, the destination node may receive the second key from a key manager as would become apparent to one having ordinary skill in the art upon reading the present disclosure.

In some approaches, the destination node receives the first key from a key manager. A key manager may be coupled to the source node, the destination node, and/or any other component in the network, for providing, generating, managing, etc., keys for sharing memory between the source node and the destination node. In preferred aspects, the key manager provides the first key to the source node and the source node uses the first key to generate first encrypted data as described in operation 606. In other preferred aspects, the key manager also provides the first key to the destination node and the destination node uses the first key to decrypt the first encrypted data (previously second encrypted data) to obtain the data in the clear. In other approaches, the first key may be received by the destination node directly from the source node as would become apparent to one having ordinary skill in the art upon reading the present disclosure.

In at least some approaches, the region of shared memory may be requested by a plurality of destination nodes. In preferred aspects, at least two of the destination nodes are each associated with a different second key. For example, a source node may encrypt the region of shared memory (e.g., the data associated therewith) in the same first key for each of two destination nodes to obtain first encrypted data. The source node may encrypt the first encrypted data in one second key (k1) to obtain second encrypted data to send to a first destination node. The source node may encrypt the first encrypted data in a different second key (k2) to obtain second encrypted data (which appears different from the second encrypted data sent to the first destination node) to send to a second destination node.

Figure 7:
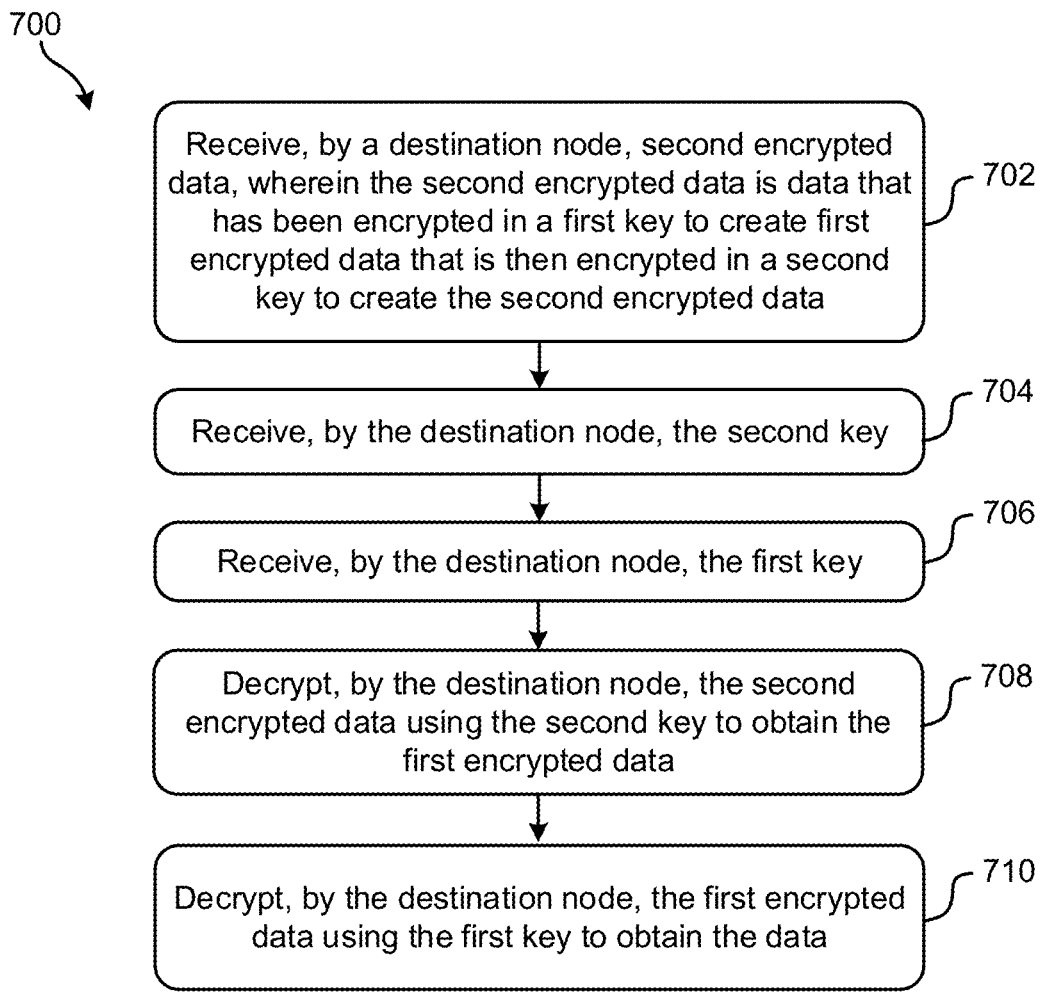
FIG. 7 is a flowchart of a method, in accordance with one aspect of the present invention.

Now referring to FIG. 7, a flowchart of a method 700 is shown according to one aspect. The method 700 may be performed in accordance with the present invention in any of the environments depicted in FIGS. 1-6 and 8-9, among others, in various aspects. Of course, more, or fewer operations than those specifically described in FIG. 7 may be included in method 700, as would be understood by one of skill in the art upon reading the present descriptions.

Each of the steps of the method 700 may be performed by any suitable component of the operating environment. For example, in various aspects, the method 700 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 includes operation 702. Operation 702 includes receiving, by a destination node, second encrypted data. The second encrypted data is data that has been encrypted in a first key to create first encrypted data that is then encrypted in a second key to create the second encrypted data. In preferred aspects, the encryption of data into first encrypted data and then the encryption of first encrypted data into the second encrypted data occurs at a source node.

In preferred aspects, the source node comprises the first key and the second key. The associated encryption of the data to create the first encrypted data and then the encryption of the first encrypted data to create the second encrypted data may be performed by at least one encrypt/decrypt function on the source node, in some approaches. In other approaches, each key may be associated with a separate encrypt/decrypt function located on the source node, as would be understood by one having ordinary skill in the art in view of the present disclosure.

In various approaches, the second encrypted data is received based at least in part on data request(s) from the destination node to the source node for data stored in a region of shared memory of the source node. In some approaches, the second encrypted data corresponds to the data stored in the region of shared memory. The data stored in the region of shared memory may be encrypted in a local encryption key and stored in local memory. In response to a request for the data stored in a region of shared memory, the source node may decrypt the data stored in the region of shared memory using a local encryption key as described in operation 604 of method 600. In other approaches, the data stored in a region of shared memory is not encrypted in a local encryption key.

In at least some approaches, the region of shared memory may be requested by a plurality of destination nodes in a manner which would become apparent to one having ordinary skill in the art upon reading the present disclosure.

Operation 704 includes receiving, by the destination node, the second key. In various approaches, the source node sends the destination node a copy of the second key which the destination node securely stores for an amount of time, a number of operations, etc., as defined by sharing policy information established between the source node and the destination node. In at least some aspects, in response to an end of the sharing period (e.g., as determined by the sharing policy, as requested by the source node, etc.), the destination node may shred the second key and/or replaces the second key with a dummy key, in a manner that would become apparent to one having ordinary skill in the art upon reading the present disclosure. The dummy key may be of any type known in the art.

Operation 706 includes receiving, by the destination node, the first key. In some approaches, the destination node receives the first key from a key manager. A key manager may be coupled to the source node, the destination node, and/or any other component in the network, for providing, generating, managing, etc., keys for sharing memory between the source node and the destination node. In other approaches, the first key may be received by the destination node directly from the source node as would become apparent to one having ordinary skill in the art upon reading the present disclosure.

Operation 708 includes decrypting, by the destination node, the second encrypted data using the second key to obtain the first encrypted data. The second encrypted data, as described above, is data which was encrypted in the first key to create the first encrypted data and then encrypted in the second key to create the second encrypted data.

Operation 710 includes decrypting, by the destination node, the first encrypted data using the first key to obtain the data. The destination node may use an encrypt/decrypt function and the second key (sent by the source node, in some approaches) to obtain the first encrypted data. The destination node may use an encrypt/decrypt function and the first key (sent by the key manager, in some approaches) to obtain the data. The data, as discussed above may be data in the clear, unencrypted data, plaintext data, data in another key-encrypted form, etc.

Figure 8:
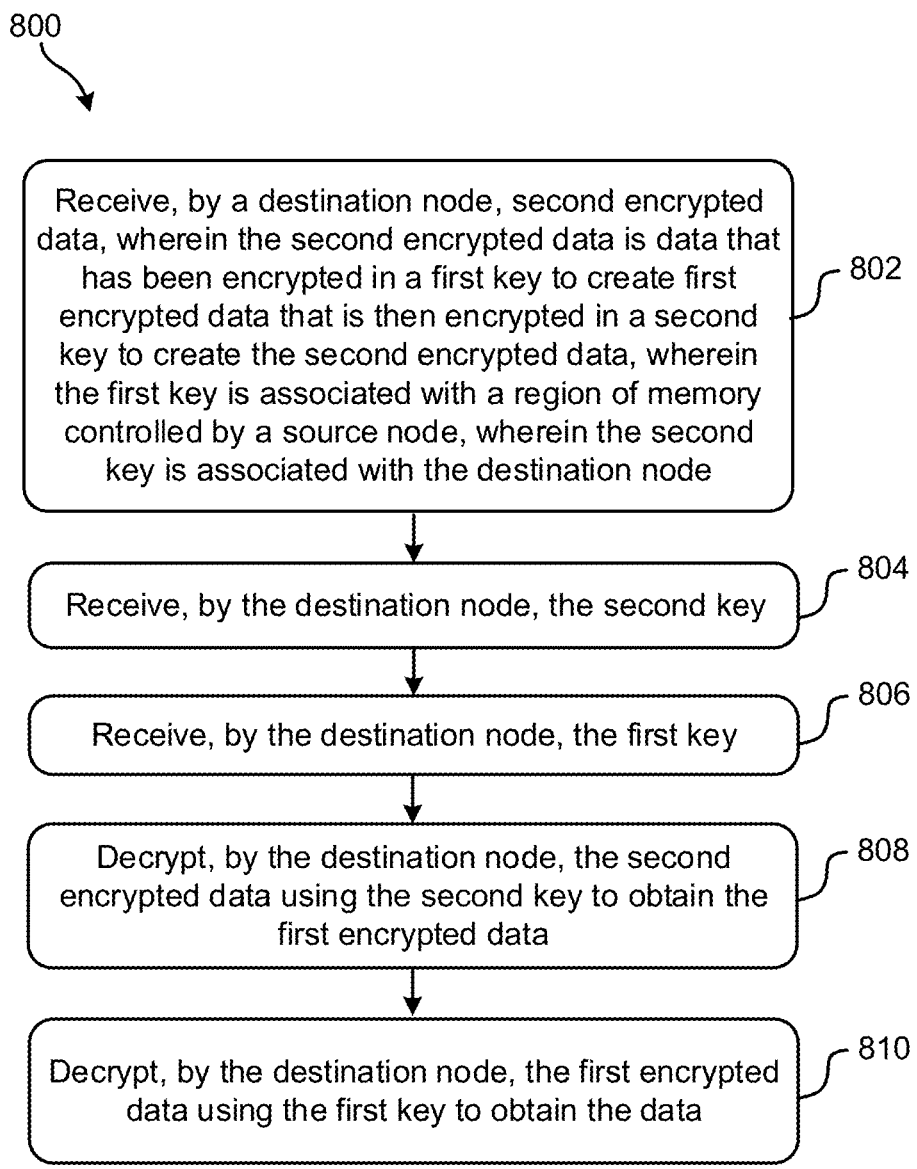
FIG. 8 is a flowchart of a method, in accordance with one aspect of the present invention.

Now referring to FIG. 8, a flowchart of a method 800 is shown according to one aspect. The method 800 may be performed in accordance with the present invention in any of the environments depicted in FIGS. 1-7 and 9, among others, in various aspects. Of course, more, or fewer operations than those specifically described in FIG. 8 may be included in method 800, as would be understood by one of skill in the art upon reading the present descriptions.

Each of the steps of the method 800 may be performed by any suitable component of the operating environment. For example, in various aspects, the method 800 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 includes operation 802. Operation 802 includes receiving, by a destination node, second encrypted data. The second encrypted data is data that has been encrypted in a first key to create first encrypted data that is then encrypted in a second key to create the second encrypted data. In preferred aspects, the encryption of data into first encrypted data and then the encryption of first encrypted data into the second encrypted data occurs at a source node.

In various aspects, the first key is associated with a region of memory controlled by source node and the second key is associated with the destination node. For example, the region of memory may be requested by the destination node or a plurality of destination nodes including the destination node. Each destination node may be associated with the same first key. In preferred aspects, at least two of the destination nodes are each associated with a different second key. For example, a source node may encrypt the region of shared memory (e.g., the data associated therewith) in the same first key for each of two destination nodes to obtain first encrypted data. The source node may encrypt the first encrypted data in one second key (k1) to obtain second encrypted data to send to a first destination node. The source node may encrypt the first encrypted data in a different second key (k2) to obtain second encrypted data (which appears different from the second encrypted data sent to the first destination node) to send to a second destination node.

In another aspect, each destination node may be associated with a different first key. In this aspect, the source node may be sharing different regions of memory with each of the destination nodes. Each region of memory may be protected by a different first key. In other aspects, each destination node may be associated with a different first key where the source node has more than one external memory region. Each external memory region may be associated with different first keys and/or different second keys.

In other approaches, each destination node may be associated with a different first key and the same second key. In preferred aspects, at least two of the destination nodes are each associated with a different first key. For example, a source node may encrypt the region of shared memory (e.g., the data associated therewith) in a first key for a first destination node and encrypt the same or different region of shared memory with a different first key for a second destination node to obtain two different first encrypted data sets. Each set of first encrypted data may be encrypted by the same second key to obtain two different second encrypted data sets. The source node may send each second encrypted data to the respective destination node in a manner which would become apparent to one having ordinary skill in the art upon reading the present disclosure.

In various aspects, the second encrypted data preferably corresponds to the region of shared memory controlled by the source node. For example, the second encrypted data may be the data stored in the region of shared memory coupled to the source node. In other aspects, the second encrypted data corresponds to the region of shared memory controlled by the source node wherein the shared memory is remote to the source node.

In preferred aspects, the source node comprises the first key and the second key. The associated encryption of the data to create the first encrypted data and then the encryption of the first encrypted data to create the second encrypted data may be performed by at least one encrypt/decrypt function on the source node, in some approaches. In other approaches, each key may be associated with a separate encrypt/decrypt function located on the source node, as would be understood by one having ordinary skill in the art in view of the present disclosure.

In various approaches, the data stored in the shared memory of the source node is encrypted in a local key of the source node. The source node comprises the local key. The local key is not extractable (e.g., not shareable) and is preferably securely stored in the source node. In preferred aspects, the source node uses the local key to encrypt the data stored in local memory (e.g., locally encrypted memory). The locally encrypted data from the locally encrypted memory may be decrypted, by the source node, using the local key, prior to encryption in the first key to obtain first encrypted data, as described in at least some aspects of method 600.

Operation 804 includes receiving, by the destination node, the second key. In various approaches, the source node sends the destination node a copy of the second key which the destination node securely stores for an amount of time, a number of operations, etc., as defined by sharing policy information established between the source node and the destination node. In at least some aspects, in response to an end of the sharing period (e.g., as determined by the sharing policy, as requested by the source node, etc.), the destination node may shred the second key and/or replaces the second key with a dummy key, in a manner that would become apparent to one having ordinary skill in the art upon reading the present disclosure. The dummy key may be of any type known in the art.

Operation 806 includes receiving, by the destination node, the first key. In some approaches, the destination node receives the first key from a key manager. A key manager may be coupled to the source node, the destination node, and/or any other component in the network, for providing, generating, managing, etc., keys for sharing memory between the source node and the destination node. In other approaches, the first key may be received by the destination node directly from the source node as would become apparent to one having ordinary skill in the art upon reading the present disclosure.

Operation 808 includes decrypting, by the destination node, the second encrypted data using the second key to obtain the first encrypted data. The second encrypted data, as described above, is data which was encrypted in the first key to create the first encrypted data and then encrypted in the second key to create the second encrypted data. The destination node may use an encrypt/decrypt function and the second key (sent by the source node, in some approaches) to obtain the first encrypted data.

Operation 810 includes decrypting, by the destination node, the first encrypted data using the first key to obtain the data. The destination node may use an encrypt/decrypt function and the second key (sent by the source node, in some approaches) to obtain the first encrypted data. The destination node may use an encrypt/decrypt function and the first key (sent by the key manager, in some approaches) to obtain the data. The data, as discussed above may be data in the clear, unencrypted data, plaintext data, data in another key-encrypted form, etc.

Figure 9:
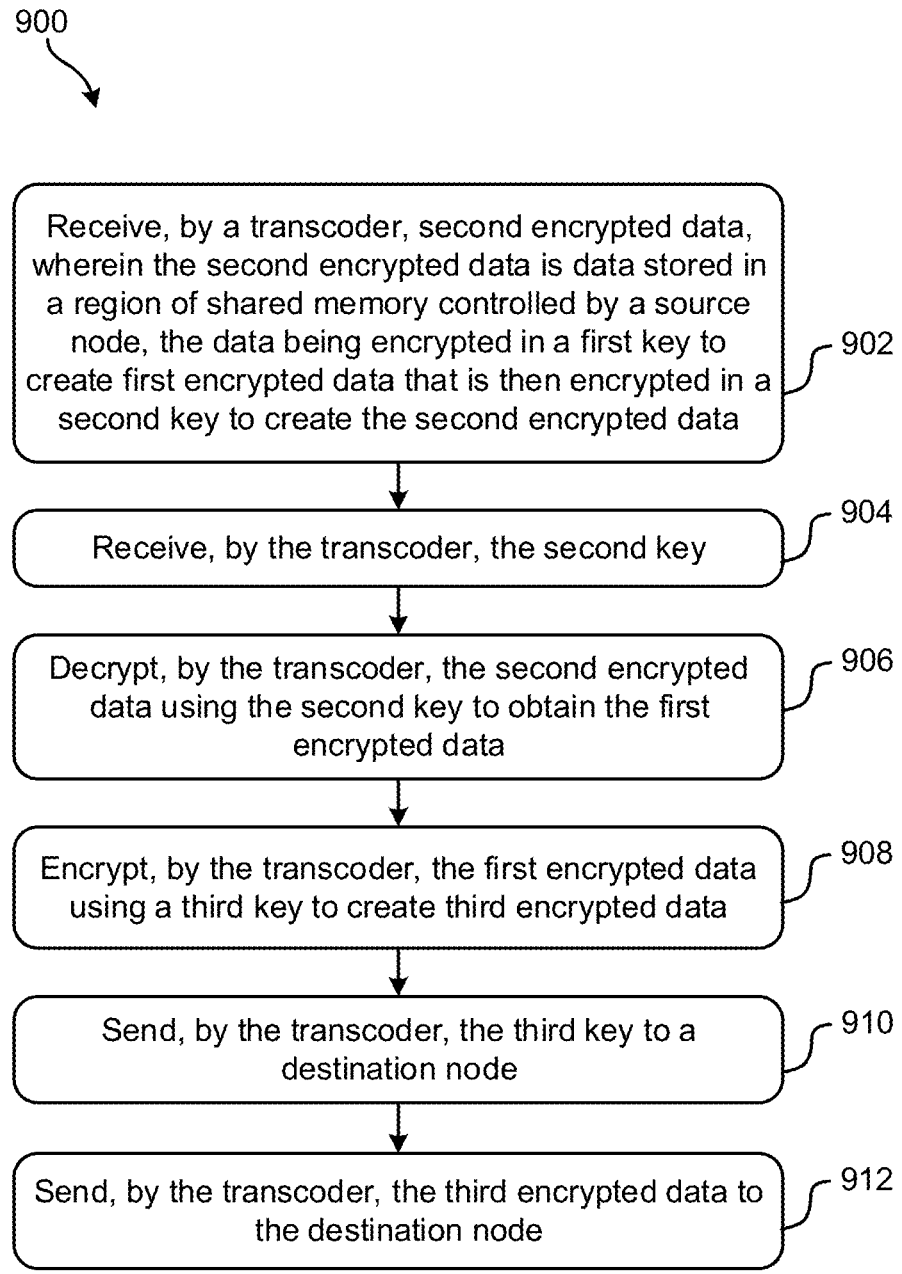
FIG. 9 is a flowchart of a method, in accordance with one aspect of the present invention.

Now referring to FIG. 9, a flowchart of a method 900 is shown according to one aspect. The method 900 may be performed in accordance with the present invention in any of the environments depicted in FIGS. 1-8, among others, in various aspects. Of course, more, or fewer operations than those specifically described in FIG. 9 may be included in method 900, as would be understood by one of skill in the art upon reading the present descriptions.

Each of the steps of the method 900 may be performed by any suitable component of the operating environment. For example, in various aspects, the method 900 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 includes operation 902. Operation 902 includes receiving, by a transcoder, second encrypted data. The second encrypted data is data that is stored in a region of shared memory controlled by a source node that has been encrypted in a first key to create first encrypted data that is then encrypted in a second key to create the second encrypted data. In preferred aspects, the encryption of data into first encrypted data and then the encryption of first encrypted data into the second encrypted data occurs at a source node. The source node comprises the first key and the second key.

In another approach, the second encrypted data is received based at least in part on data requests from the transcoder to the source node. In response to receiving a request for the data from a destination node, the transcoder may send a data request to the source node.

In various aspects, the second encrypted data is received at the transcoder from shared memory, from a source node, etc., based on data requests from at least one destination node. There may be any number of destination nodes which request data from the region of shared memory controlled by a source node via the transcoder. In some approaches, the transcoder may receive the second encrypted data in response to data requests from the destination node according to sharing policy information between the source node, the destination node, the transcoder, etc. The sharing policy information may include the memory range(s) to share, the destination node(s) to share with, the allowed access of the memory including the duration, allowed read/write operations, the number of allowed operations, what regions of shared memory may be shared between which entities, a time length for a sharing period between any entities, a number of operations associated with a sharing period between any entities, the type of operations associated with a sharing period between any entities, an amount of data which may be shared per sharing period between any entities, etc. In various approaches, the sharing policy information determines when to terminate the sharing period. The sharing period may be terminated according to the policy, in response to shredding at least one key, in response to a request to end the sharing period by the source node, a request to end the sharing period by a destination node, a power off event, any other trigger event, etc., or a combination thereof, in various aspects.

In various aspects, the first key is associated with a region of memory controlled by source node and the second key is associated with a destination node. For example, the region of memory may be requested by the destination node or a plurality of destination nodes including the destination node. Each destination node may be associated with the same first key. In preferred aspects, at least two of the destination nodes are each associated with a different second key and/or a different first key.

In some approaches, if the memory being shared is locally encrypted (e.g., encrypted in a local encryption key) at the source node, each destination node may be associated with a different first key. If the memory to be shared is the same remote memory region controlled by the source node, the first key may be the same for each destination node. If the memory is be shared includes different regions of remote memory controlled by the source node, the first key may be different for each destination node.

In various aspects, the second encrypted data preferably corresponds to the region of shared memory of the source node. For example, the second encrypted data may be the data stored in the region of shared memory coupled to the source node. In other aspects, the second encrypted data corresponds to the region of shared memory controlled by the source node wherein the shared memory is remote to the source node.

In preferred aspects, the source node comprises the first key and the second key. The associated encryption of the data to create the first encrypted data and then the encryption of the first encrypted data to create the second encrypted data may be performed by at least one encrypt/decrypt function on the source node, in some approaches. In other approaches, each key may be associated with a separate encrypt/decrypt function located on the source node, as would be understood by one having ordinary skill in the art in view of the present disclosure.

In various approaches, the data stored in the shared memory of the source node is encrypted in a local key of the source node. The source node comprises the local key. The local key is not extractable (e.g., not shareable) and is preferably securely stored in the source node. In preferred aspects, the source node uses the local key to encrypt the data stored in local memory (e.g., locally encrypted memory). The locally encrypted data from the locally encrypted memory may be decrypted, by the source node, using the local key, prior to encryption in the first key to obtain first encrypted data, as described in at least some aspects of method 600.

Operation 904 includes receiving, by the transcoder, the second key. The second key may be sent from the source node. In various approaches, the source node sends the transcoder a copy of the second key which the transcoder securely stores for an amount of time, a number of operations, etc., as defined by the sharing policy information. In at least some aspects, in response to an end of the sharing period (e.g., as determined by the sharing policy, as requested by the source node, etc.), the transcoder may shred the second key and/or replaces the second key with a dummy key, in a manner that would become apparent to one having ordinary skill in the art upon reading the present disclosure. The dummy key may be of any type known in the art.

Operation 906 includes decrypting, by the transcoder, the second encrypted data using the second key to obtain the first encrypted data. The second encrypted data, as described above, is data stored on the shared region of memory which was encrypted in the first key to create the first encrypted data and then encrypted in the second key to create the second encrypted data. According to operation 906, the transcoder may use an encrypt/decrypt function and the second key (sent by the source node) at the transcoder to obtain the first encrypted data. The transcoder preferably never obtains the data in the clear (or the original data in another key-encrypted form) where the transcoder does not have access to the first key (e.g., to decrypt the first encrypted data to obtain the data).

Operation 908 includes encrypting, by the transcoder, the first encrypted data using a third key to create third encrypted data. The first encrypted data (e.g., encrypted only in the first key) may be encrypted with a new, third key to create the third encrypted data by an encrypt/decrypt function on the transcoder. The encrypt/decrypt function may be the same as or different from (e.g., separate from, only for use with the third key, etc.) the encrypt/decrypt function of operation 906. In preferred approaches, the third key is received at the transcoder from a transcoder manager. In other approaches, the transcoder manager sends the third key to the transcoder and to the destination node. The transcoder manager may generate the third key and send the third key to the transcoder and/or the destination node in a manner which would become apparent to one having ordinary skill in the art upon reading the present disclosure. In at least some approaches, the third key may be generated by the transcoder by a key generator on the transcoder. In other approaches, any key may be generated and/or managed by a key manager and/or key generator coupled to the source node, the transcoder, the destination node, etc.

Operation 910 includes, sending, by the transcoder, the third key to a destination node. In preferred approaches, the destination node which receives the third key is the destination node from which the request for the data originated. In various approaches, the transcoder sends the destination node a copy of the third key which the destination node securely stores for an amount of time, a number of operations, etc., as defined by the sharing policy information, and/or in any manner that would become apparent to one having ordinary skill in the art upon reading the present disclosure. In preferred aspects, in response to an end of the sharing period (e.g., as determined by the sharing policy, as requested by the source node, etc.), the transcoder shreds the third key and/or replaces the third key with a dummy key for ending data sharing between the source node and the destination node, in any manner that would become apparent to one having ordinary skill in the art upon reading the present disclosure. The dummy key may be of any type known in the art.

Operation 912 includes sending, by the transcoder, the third encrypted data to the destination node. The third encrypted data, as described above, is the first encrypted data (e.g., data encrypted in the first key) encrypted using the third key to create the third encrypted data. The destination node received the first key directly from the source node in various approaches. The destination node is configured to decrypt the third encrypted data using the third key to obtain the first encrypted data using an encrypt/decrypt function on the destination node, in various approaches. The destination node is configured to decrypt the first encrypted data using the first key to obtain the data using an encrypt/decrypt function on the destination node (which may be the same or different from the encrypt/decrypt function for decrypting the third encrypted data to obtain the first encrypted data). The data, as discussed above may be data in the clear, unencrypted data, plaintext data, data in another key-encrypted form, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by a source node, a request from a destination node for data stored in a region of shared memory controlled by the source node, the data being encrypted in a local key of the source node, the request originating from the destination node, wherein the shared memory has a plurality of other regions, the other regions being associated with other destination nodes, wherein data stored in the other regions of memory are protected by unique local keys associated with the other regions;
decrypting, by the source node, the locally encrypted data using the local key;
encrypting, by the source node, the decrypted data using a first key for generating first encrypted data;
encrypting, by the source node, the first encrypted data using a second key for generating second encrypted data; and
sending, by the source node, the second encrypted data to the destination node.

2. The computer-implemented method of claim 1, comprising sending, by the source node, the second key to the destination node, wherein the destination node is able to access the data without access to the local key of the source node.

3. The computer-implemented method of claim 1, wherein the region of shared memory is requestable by a plurality of destination nodes, wherein at least two of the destination nodes are associated with a different second key that is different than the second key used to generate the second encrypted data.

4. The computer-implemented method of claim 1, wherein the destination node is configured to decrypt the second encrypted data using the second key to obtain the first encrypted data, wherein the destination node is configured to decrypt the first encrypted data using the first key to obtain the data.

5. A computer-implemented method, comprising:
receiving, by a destination node, second encrypted data sent by a source node in response to a request sent to the source node by the destination node,
wherein the second encrypted data is data that has been encrypted in a first key to create first encrypted data that is then encrypted in a second key to create the second encrypted data;
receiving, by the destination node, the second key;
receiving, by the destination node, the first key from a key manager located remotely from the source and destination nodes;
decrypting, by the destination node, the second encrypted data using the second key to obtain the first encrypted data; and
decrypting, by the destination node, the first encrypted data using the first key to obtain the data,
wherein the second encrypted data corresponds to data stored in a region of shared memory controlled by a source node, the region being associated with the destination node, the shared memory having a plurality of other regions associated with other destination nodes, wherein the data stored in the other regions of memory are protected by different first keys that are different than the first key.

6. The computer-implemented method of claim 5, wherein a local key used to encrypt the data when stored on the source node is ephemeral whereby a power outage on memory results in destruction of the local key, wherein the local key is not available to the destination node.

7. The computer-implemented method of claim 5, wherein the first encrypted data is stored in the region of shared memory, wherein a copy of the first key on the source node is ephemeral whereby a power outage on memory results in destruction of the first key on the source node.

8. The computer-implemented method of claim 5, wherein the second encrypted data corresponds to data stored in a region of shared memory controlled by a source node, wherein the data stored in the shared memory is encrypted in a local key of the source node, wherein the local key is not available to the destination node.

9. The computer-implemented method of claim 8, wherein the local key of the source node is ephemeral whereby a power outage on memory destroys the local key.

10. A computer-implemented method, comprising: receiving, by a destination node, second encrypted data,
wherein the second encrypted data is data that has been encrypted in a first key to create first encrypted data that is then encrypted in a second key to create the second encrypted data, wherein the first key is associated with a region of memory controlled by a source node, wherein the memory is a shared memory having a plurality of different regions, the different regions being associated with different respective destination nodes, wherein the data stored in the different regions of memory are protected by different first keys that are different than the first key, wherein the second key is associated with the destination node;
receiving, by the destination node, the second key;
receiving, by the destination node, the first key;
decrypting, by the destination node, the second encrypted data using the second key to obtain the first encrypted data; and
decrypting, by the destination node, the first encrypted data using the first key to obtain the data.

11. The computer-implemented method of claim 10, wherein the second key is received from the source node.

12. The computer-implemented method of claim 10, wherein the second encrypted data corresponds to the region of memory controlled by the source node, wherein the first key is ephemeral whereby a power outage on memory destroys the first key.

13. The computer-implemented method of claim 10, comprising replacing, by the destination node, the second key with a dummy key for ending data sharing between the source node and the destination node.

14. The computer-implemented method of claim 10, wherein the region of memory controlled by the source node is requested by a plurality of destination nodes, wherein each destination node is associated with the same second key.

15. A computer-implemented method, comprising:
receiving, by a transcoder, second encrypted data,
wherein the second encrypted data is data stored in a region of shared memory controlled by a source node, the data being encrypted in a first key to create first encrypted data that is then encrypted in a second key to create the second encrypted data;
receiving, by the transcoder, the second key;
decrypting, by the transcoder, the second encrypted data using the second key to obtain the first encrypted data;
encrypting, by the transcoder, the first encrypted data using a third key to create third encrypted data;
sending, by the transcoder, the third key to a destination node; and
sending, by the transcoder, the third encrypted data to the destination node,
wherein the second key is received from the source node, wherein the shared memory has a plurality of other regions, the other regions being associated with other destination nodes, wherein data stored in the other regions of memory are protected by unique local keys associated with the other regions.

16. The computer-implemented method of claim 15, wherein the third key is received from a transcoder manager.

17. The computer-implemented method of claim 15, wherein the second encrypted data corresponds to the region of memory controlled by the source node.

18. The computer-implemented method of claim 15, wherein the region of memory controlled by the source node is requested by the destination node.

19. The computer-implemented method of claim 15, wherein the region of memory controlled by the source node is requested by a plurality of destination nodes, wherein each destination node is associated with the same first key, wherein at least two of the destination nodes are each associated with a different second key.

20. The computer-implemented method of claim 15, wherein the destination node is configured to decrypt the third encrypted data using the third key to obtain the first encrypted data, wherein the destination node is configured to decrypt the first encrypted data using the first key to obtain the data.

21. A computer program product, the computer program product comprising:
one or more computer readable storage media, and program instructions collectively stored on the one or more computer readable storage media, the program instructions comprising:
program instructions to receive, by a source node, a request from a destination node for data stored in a region of shared memory of the source node, the data being encrypted in a local key of the source node, the shared memory having a plurality of other regions, the other regions being associated with other destination nodes, wherein the other regions of the shared memory are associated with distinct first keys corresponding to the other regions, wherein the other destination nodes are associated with distinct second keys corresponding to the other destination nodes;
program instructions to decrypt, by the source node, the locally encrypted data using the local key;
program instructions to encrypt, by the source node, the decrypted data using a first key for generating first encrypted data;
program instructions to encrypt, by the source node, the first encrypted data using a second key for generating second encrypted data; and
program instructions to send, by the source node, the second encrypted data to the destination node.

* * * * *